(12) United States Patent
Farroni et al.

(10) Patent No.: US 7,116,887 B2
(45) Date of Patent: Oct. 3, 2006

(54) OPTICAL FIBER

(75) Inventors: Julia A. Farroni, Windsor, CT (US); Adrian Carter, Bulli (AU); Kanishka Tankala, South Windsor, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 10/619,376

(22) Filed: Jul. 11, 2003

(65) Prior Publication Data

US 2004/0086245 A1    May 6, 2004

Related U.S. Application Data

(63) Continuation-in-part of application No. 10/392,243, filed on Mar. 19, 2003, now abandoned, which is a continuation-in-part of application No. 10/392,064, filed on Mar. 19, 2003, now abandoned.

(60) Provisional application No. 60/366,124, filed on Mar. 19, 2002, provisional application No. 60/365,961, filed on Mar. 19, 2002.

(51) Int. Cl.
*G02B 6/17* (2006.01)

(52) U.S. Cl. ...................... 385/142; 385/123

(58) Field of Classification Search ......... 385/141–145
See application file for complete search history.

(56) References Cited

U.S. PATENT DOCUMENTS

| | | | |
|---|---|---|---|
| 3,729,690 A | 4/1973 | Snitzer | |
| 3,808,549 A | 4/1974 | Maurer | |
| 4,709,986 A | 12/1987 | Hicks, Jr. | |
| 4,815,079 A | 3/1989 | Snitzer et al. | |
| 5,121,460 A | 6/1992 | Tumminelli et al. | |
| 5,319,652 A | 6/1994 | Moeller et al. | |
| 5,418,880 A | 5/1995 | Lewis et al. | |
| 5,452,394 A | 9/1995 | Huang | |
| 5,533,163 A | 7/1996 | Muendel | |
| 5,673,354 A * | 9/1997 | Akasaka et al. | ............ 385/127 |
| 5,756,209 A | 5/1998 | Hale | |
| 5,761,234 A | 6/1998 | Craig et al. | |
| 5,818,630 A | 10/1998 | Fermann et al. | |
| 5,822,489 A | 10/1998 | Hale | |
| 5,864,644 A | 1/1999 | DiGiovanni et al. | |
| 5,864,645 A | 1/1999 | Zellmer et al. | |
| 5,873,923 A | 2/1999 | DiGiovanni | |

(Continued)

FOREIGN PATENT DOCUMENTS

EP        1 043 816 A2    10/2000

(Continued)

*Primary Examiner*—Juliana Kang
(74) *Attorney, Agent, or Firm*—Peter J. Rainville

(57) ABSTRACT

An optical fiber comprises a photosensitive core that includes a concentration of a first material that increases the refractive index of the core and a concentration of a second material that is other than boron and that reduces the refractive index of the core. A cladding is disposed about the core for tending to confine light to the core. The fiber also includes at least one longitudinally extending region having a thermal coefficient of expansion that is different from the thermal coefficient of expansion of the cladding. In another embodiment, the core includes a concentration of germanium and a concentration of boron. Also disclosed is a polarization-maintaining double-clad (PM DC) fiber comprising one or both of at least one circular axially extending stress inducing region(s) and an inner cladding comprising a circular outer perimeter. Fibers according to the invention can include a rare earth dopant for emitting light of a selected wavelength responsive to being pumped by pump light of a pump wavelength that is different than the selected wavelength.

30 Claims, 9 Drawing Sheets

U.S. PATENT DOCUMENTS

| | | |
|---|---|---|
| 5,881,187 A | 3/1999 | Modavis |
| 5,892,615 A | 4/1999 | Grubb et al. |
| 5,898,715 A | 4/1999 | LeGrange et al. |
| 5,912,910 A | 6/1999 | Sanders et al. |
| 5,949,941 A | 9/1999 | DiGiovanni |
| 5,966,491 A | 10/1999 | DiGiovanni |
| 6,031,850 A | 2/2000 | Cheo |
| 6,101,199 A | 8/2000 | Wang et al. |
| 6,115,526 A | 9/2000 | Morse |
| 6,151,429 A | 11/2000 | Kristensen et al. |
| 6,154,595 A | 11/2000 | Yokogawa et al. |
| 6,157,763 A | 12/2000 | Grubb et al. |
| 6,229,828 B1 | 5/2001 | Sanders et al. |
| 6,249,624 B1 | 6/2001 | Putnam et al. |
| 6,263,003 B1 | 7/2001 | Huang et al. |
| 6,304,705 B1 | 10/2001 | Kalish et al. |
| 6,345,141 B1 | 2/2002 | Grubb et al. |
| 6,411,762 B1 | 6/2002 | Anthon et al. |
| 6,477,307 B1 | 11/2002 | Tankala et al. |
| 6,483,973 B1 | 11/2002 | Mazzarese et al. |
| 6,538,807 B1 | 3/2003 | Kakui et al. |
| 6,625,363 B1 | 9/2003 | Carter et al. |
| 6,687,445 B1 * | 2/2004 | Carter et al. ................. 385/127 |
| 6,738,549 B1 * | 5/2004 | Inaba et al. .................. 385/123 |
| 6,779,364 B1 * | 8/2004 | Tankala et al. ............... 65/390 |
| 2002/0197039 A1 | 12/2002 | Carter et al. |
| 2003/0059184 A1 | 3/2003 | Tankala et al. |
| 2004/0069019 A1 * | 4/2004 | Carter et al. ................... 65/414 |

FOREIGN PATENT DOCUMENTS

| | | |
|---|---|---|
| WO | WO 93/15536 | 8/1993 |
| WO | WO 99/30391 | 6/1999 |

* cited by examiner

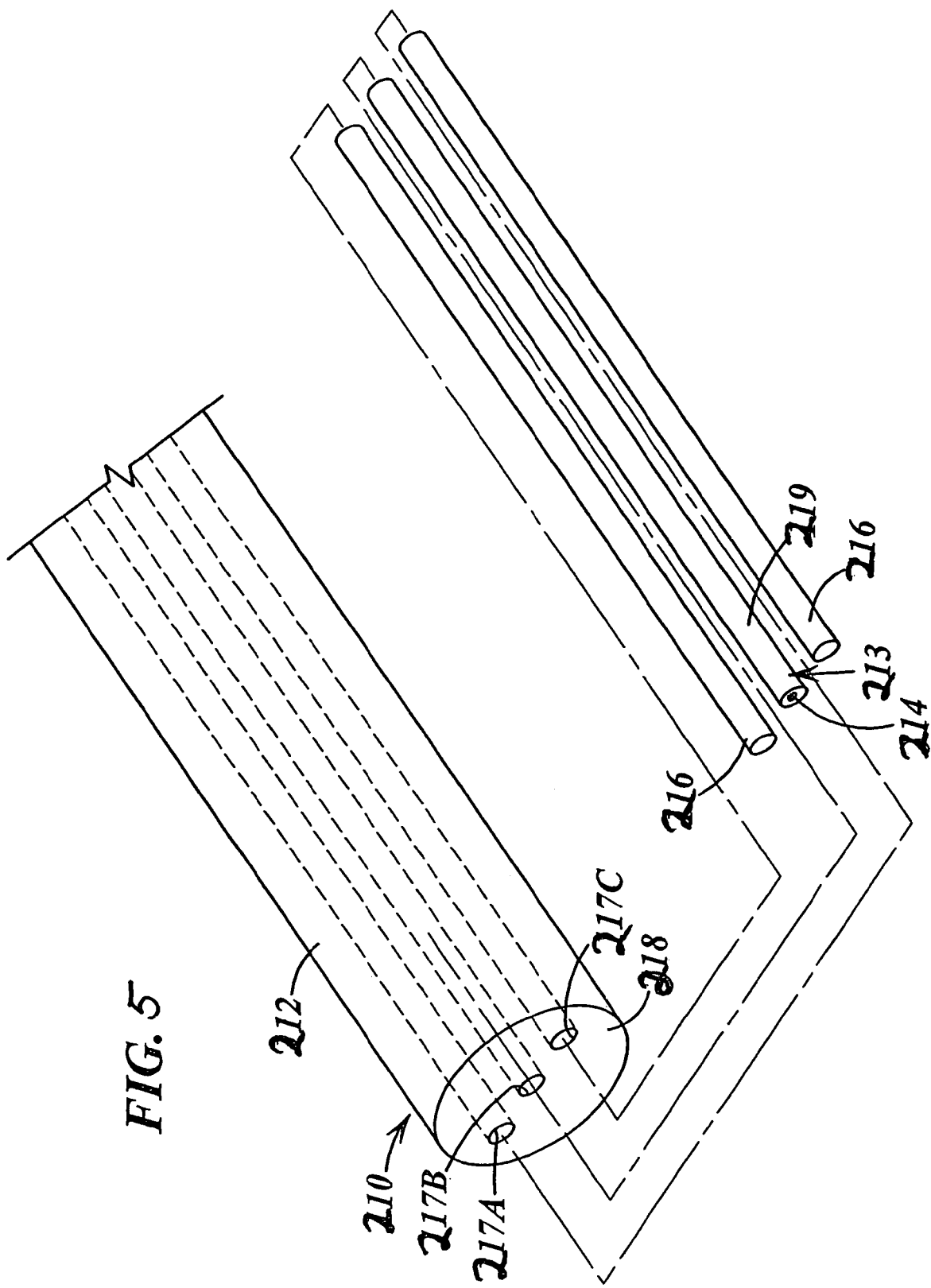

OPTICAL FIBER

CROSS REFERENCE TO RELATED APPLICATIONS.

The present application is a continuation-in-part of application Ser. No. 10/392,064, filed Mar. 19, 2003 now abandoned and entitled "Birefringent Photosensitive Optical Fiber", and which is incorporated herein by reference. application Ser. No. 10/392,064 claims priority to Provisional Patent Application 60/365,961, filed Mar. 19, 2002 and entitled "Birefringent Photosensitive Optical Fiber", and which is also incorporated herein by reference. The present application is also a continuation-in-part of application Ser. No. 10/392,243, filed Mar. 19, 2003 now abandoned and entitled "Birefringent, Photosensitive Optical Fiber And Methods Of Making The Fiber", and which is incorporated herein by reference application Ser. No. 10/392,243 claims priority to Provisional Patent Application 60/366,124, filed Mar. 19, 2002 and entitled "Birefringent, Photosensitive Optical Fiber And Methods Of Making The Fiber", and which is also incorporated herein by reference.

FIELD OF THE INVENTION

The present invention relates to optical waveguides and to methods of making the waveguides and, more particularly, to optical fiber waveguides that are one or more of birefringent or photosensitive, or that may include a second cladding.

BACKGROUND OF THE INVENTION

A birefringent optical waveguide or fiber, such as a polarization-maintaining fiber that suppresses coupling or crosstalk between plural polarizations of waves, has been found to be advantageous. In particular, polarization maintaining fibers are useful in coupling laser diodes to waveguides that support only a single polarization, such as titanium indiffused waveguides in lithium niobate.

Several techniques are known for providing birefringent optical fibers. For example, see U.S. Pat. No. 4,395,270 to Blankenship et al. The '270 patent teaches a fiber that includes a cladding having two longitudinally-extending regions formed of a material having a thermal coefficient of expansion (TCE) that is different from that of the cladding. When the fiber is drawn, the longitudinally extending regions and the cladding regions therebetween shrink different amounts and cause a stress to be applied to the core of the fiber, which in turn promotes birefringence.

Various techniques for making an optical fiber having longitudinally extending regions have been proposed. For example, Blankenship et al., discussed above, teaches forming an optical fiber preform by providing a glass tube, inserting a core rod into the glass tube, inserting two stress rods having a particular TCE into the glass tube on opposing sides of the core rod and then filling the interstices with additional glass rods each having a different TCE than that of the stress rods. Optical fiber is then drawn from the preform. U.S. Pat. No. 4,561,871 to Berkey proposes another technique for forming a birefringent optical fiber. In particular, Berkey describes providing a preform of glass having a core and a cladding and forming a pair of longitudinally extending holes in the cladding. A pair of rods is formed from a material having a TCE different from that of the cladding and, thereafter, the rods are inserted into the holes in the cladding.

A photosensitive optical fiber has a refractive index that can be relatively permanently modified via exposure of the fiber to actinic radiation having a selected wavelength. Photosensitive optical fiber can be useful in many applications. For example, a photosensitive fiber may be selectively exposed to ultraviolet (UV) radiation to form an index grating, such as a Fiber Bragg Grating (FBG), in the core and/or the cladding of the optical fiber. An index grating can include spaced regions of the fiber wherein the index of refraction is different than the normal index of refraction of the fiber. An index grating may be written using various techniques known in the art, such as by using an amplitude mask, a phase mask, or by using interferometric techniques. An index grating may be used in a fiber coupled to a laser to stabilize the output wavelength of the laser. Also, an index grating may be employed with a circulator to select a particular wavelength out of multiple wavelengths propagating along an optical fiber. Further, index gratings may be used as sensors, as well as in many other applications, including providing memory storage.

It is desirable in certain circumstances that an optical fiber have an enhanced photosensitivity, such that the process of writing an index grating in the fiber via the selected exposure of the fiber to actinic radiation, which can take a significant period of time, be shortened. One example of a photosensitive fiber is described in U.S. Pat. No. 6,229,945 to Ainslie et al., which teaches that high concentrations of boron be used in a fiber to enhance the photosensitivity of the fiber. Boron, however, can have significant disadvantages. Germanium is known to be photosensitive in the absence of boron, but boron is useful in enhancing the photosensitivity of a germanium doped fiber.

Although highly photosensitive optical fibers are known in the art, as are highly birefringent optical fibers, Applicants are not aware that the art teaches how to successfully provide a useful optical fiber that provides a selected birefringence and a selected photosensitivity. Such a fiber would represent a welcome advance in the art and have many uses.

Accordingly, it is an object of the present invention to address one or more of the foregoing disadvantages or deficiencies of the prior art.

SUMMARY OF THE INVENTION

In one aspect of the invention there is provided an optical fiber comprising a photosensitive core comprising a concentration of a first material that increases the refractive index of the core and a concentration of a second material that is other than boron and that reduces the refractive index of the core. A cladding is disposed about the core for tending to confine light to the core. The fiber also includes at least one longitudinally extending region having a thermal coefficient of expansion that is different from the thermal coefficient of expansion of the cladding. The fiber is advantageously photosensitive and birefringent. In one practice of the invention the core supports no more than substantially a few spatial modes of light at the intended operating wavelength of the fiber.

The at least one longitudinally extending region may comprise at least one pair of longitudinally extending regions disposed in diametrically opposed portions of the cladding and spaced from the core. The optical fiber may include an index grating. The thermal coefficient of expansion of the regions may be greater than or less than that of the cladding, and the cladding may comprise a photosensitive material. The refractive index of the longitudinally extending regions may substantially match the refractive index of the cladding. The cladding may include an index grating.

The core may comprise silicon dioxide ($SiO_2$), and the first material may comprise germanium dioxide ($GeO_2$) and the second material may comprise fluorine (F). The concentration of germanium dioxide ($GeO_2$) may be at least about 10.0% by weight and the concentration of fluorine may be at least about 0.1% by weight. In one practice, the concentration of germanium dioxide ($GeO_2$) is from about 10.0% by weight to about 40.0% by weight. In another practice, the concentration of fluorine (F) is from about 0.1% by weight to about 5.0% by weight. In yet another practice, the concentration of germanium dioxide ($GeO_2$) is from about 10.0% by weight to about 20.0% by weight. In an additional practice, the concentration of fluorine (F) is from about 0.2% by weight to about 3.0% by weight.

More specifically, the core may consist essentially of silicon dioxide ($SiO_2$) and at least one oxide of germanium and fluorine. Even more specifically, the core may consist essentially of silicon dioxide ($SiO_2$) doped with a concentration of $GeO_2$ of at least about 10% by weight and a concentration of fluorine of at least about 0.1% by weight.

In certain realizations of the invention, the longitudinally extending regions each have a generally cylindrical outer circumference or perimeter. The longitudinally extending regions may each comprise silicon dioxide ($SiO_2$) doped with one or more materials from the group consisting of germanium dioxide ($GeO_2$), boron trioxide ($B_2O_3$), phosphorous pentoxide ($P_2O_5$), titanium dioxide ($TiO_2$) and aluminum trioxide ($Al_2O_3$). The longitudinally extending regions may each comprise silicon dioxide ($SiO_2$) doped with boron trioxide ($B_2O_3$). The cladding of the optical fiber may comprise silica.

In yet another aspect of the invention, there is provided an optical fiber comprising a core comprising silicon dioxide ($SiO_2$) doped with germanium dioxide ($GeO_2$) and fluorine (F), and wherein the concentration of germanium dioxide ($GeO_2$) is from about 10.0% by weight to about 40.0% by weight and the concentration of fluorine (F) is from about 0.1% by weight to about 5% by weight.

In a further aspect of the invention, the core may comprise silicon dioxide ($SiO_2$) and at least one of the first material and the second material may comprise at least one element selected from the group consisting of germanium (Ge), tin (Sn), cerium (Ce) and tantallum (Ta). A cladding comprising silica may be disposed in coaxial relationship with the core, and a plurality of longitudinally extending regions having a generally circular outer circumference may be disposed in diametrically opposed portions of the cladding. The regions are spaced from the core and each of the regions has a thermal coefficient of expansion that is different from that of the cladding. Each of the regions may comprise silicon dioxide ($SiO_2$) doped with boron trioxide ($B_2O_3$). The core has a refractive index that is greater than that of the cladding and may include an index grating written thereon.

In yet another aspect of the invention, there is provided an optical fiber comprising a core, a cladding disposed about the core, means for applying stress to the core to create birefringence during propagation of light through the optical fiber, and means for receiving an index grating. The means for receiving an index grating can include a concentration of a first material that increases the refractive index of at least one of the core and the cladding and a concentration of a second material that reduces the refractive index of the one of the core and the cladding. The second material is other than boron. In one practice, the core supports no more than substantially a few spatial modes of light at a wavelength at which the fiber is intended to operate.

In another aspect of the invention, the means for applying stress to the core may comprise longitudinally extending regions disposed in diametrically opposed portions of the cladding. The regions may be spaced from the core and each of the regions may have a thermal coefficient of expansion that is different from that of the cladding and the longitudinally extending regions may each comprise silicon dioxide ($SiO_2$) doped with boron trioxide ($B_2O_3$) and phosphorous pentoxide ($P_2O_5$).

In yet a further additional aspect of the invention there is provided an optical fiber comprising a longitudinally extending core and a cladding disposed about the core. Also included is a plurality of regions disposed in diametrically opposed portions of the cladding and extending in a longitudinal direction of the cladding, where the regions are spaced from the core and each of the regions has a thermal coefficient of expansion that is different from that of the cladding. At least one of the core, the cladding and the regions is photosensitive and comprises a concentration of a first material that increases the refractive index of the at least one of the core, cladding and regions and a concentration of a second material that reduces the refractive index of the at least one of the core, cladding and regions, where the second material is other than boron. The fiber is advantageously photosensitive and birefringent. In one practice, the core supports no more than substantially a few modes of light at the intended operating wavelength(s) of the fiber.

In a further aspect of the present invention, an optical fiber may comprise a photosensitive core that comprises a concentration of germanium of at least 10% by mole and the core being substantially free of a refractive index reducing material. A cladding may be disposed about the core for tending to confine light to the core and the optical fiber may further comprise at least one longitudinally extending region having a thermal coefficient of expansion that is different from the thermal coefficient of expansion of the cladding. Advantageously, the optical fiber is photosensitive and birefringent. In one practice of the invention, the core supports no more than substantially a few modes of light at the intended operating wavelength(s) of the fiber.

The core may comprise a concentration of $GeO_2$ of at least 15% by mole and have a numerical aperture (NA) of larger than 0.2. Even more specifically, the optical fiber may have a numerical aperture (NA) of larger than 0.25.

In one aspect, a fiber according to the invention comprises a photosensitive core comprising a concentration of germanium and a concentration of boron; a cladding disposed about the core; and at least one longitudinally extending region having a thermal coefficient of expansion that is different from the thermal coefficient of expansion of the cladding whereby the optical fiber is photosensitive and birefringent. In one practice of the invention, the core propagates no more than substantially a few spatial modes of light at a wavelength at which the fiber is intended to operate. In another practice of the invention, the core propagates more than substantially a few modes of light, such as by having a V number in excess of 10 and the core has a low numerical aperture, such as a numerical aperture of less than 0.13. Other such practices of the invention are described in more detail below.

The at least one longitudinally extending region may comprise at least one pair of longitudinally extending regions disposed in diametrically opposed portions of the cladding, and the fiber may comprise an index grating. The thermal coefficient of expansion of the regions can be greater the thermal coefficient of expansion of the cladding, or can be less than the thermal coefficient of expansion of the cladding. The cladding of the fiber may be photosensitive, and can include an index grating.

Germanium and boron may be present in various concentrations. The concentration of germanium dioxide ($GeO_2$) may be at least 7.0% by mole and the concentration of boron trioxide ($B_2O_3$) is at least 1.0% by mole. In another practice of the invention, the concentration of germanium dioxide ($GeO_2$) is at least 10.0% by mole and the concentration of boron trioxide ($B_2O_3$) is at least 2.0% by mole. In yet another example, the concentration of germanium dioxide ($GeO_2$) is at least 15.0% by mole and the concentration of boron trioxide ($B_2O_3$) is at least 3.0% by mole. Continuing with other examples, the concentration of germanium dioxide ($GeO_2$) can be from 8.0% to mole to 10.1% by mole. The concentration of boron trioxide ($B_2O_3$) can be from 4.1% by mole to 12.2% by mole.

In another aspect, a fiber according to the invention comprises a core comprising silicon dioxide ($SiO_2$) doped with germanium dioxide ($GeO_2$) and boron trioxide ($B_2O_3$) and wherein the concentration of germanium dioxide ($GeO_2$) is from about 8.6% by mole to about 10.1% by mole and the concentration of boron trioxide ($B_2O_3$) is from about 4.1% by mole to about 12.2% by mole; a silica cladding disposed in coaxial relationship with the core; and a plurality of cylindrical longitudinally extending regions disposed in diametrically opposed portions of the cladding, where the regions are spaced from the core and each of the regions has a thermal coefficient of expansion that is different from that of the cladding. Each of the regions may comprise silicon dioxide ($SiO_2$) doped with one or more materials from the group consisting of germanium dioxide ($GeO_2$), boron trioxide ($B_2O_3$), phosphorous pentoxide ($P_2O_5$), titanium dioxide ($TiO_2$) and aluminum trioxide ($Al_2O_3$).

In yet a further aspect, a fiber according to the invention comprises a core; a cladding disposed about the core; a plurality of regions disposed in diametrically opposed portions of the cladding and extending in a longitudinal direction of the cladding, where the regions are spaced from the core and each of the regions has a thermal coefficient of expansion that is different from that of the cladding; and wherein the core has a refractive index that is greater than that of the cladding and at least a portion of the cladding is photosensitive. The optical fiber is photosensitive and birefringent.

The invention also includes methods for providing an optical fiber. In one aspect, a method according to the invention comprises providing a longitudinally extending core member comprising a core index of refraction; providing a longitudinally extending cladding member having an index of refraction that is less than the core index of refraction; forming three longitudinally extending apertures in the cladding member, a first of the three apertures being generally centrally located in the cladding member and the other two being disposed diametrically about the first; providing two longitudinally extending members having a thermal coefficient of expansion different from the thermal coefficient of expansion of the cladding member; and inserting the core member into the first aperture and the two longitudinally extending members into the remaining apertures of the cladding member thereby forming a preform for drawing a birefringent, photosensitive optical fiber. An optical fiber can then be drawn from the preform.

The core member may comprise a concentration of $GeO_2$ of at least 8.0% by mole, and the core member may include a concentration of germanium and a concentration of boron. The concentration of germanium may include a concentration of germanium dioxide ($GeO_2$) of at least about 7.0% by mole and the concentration of boron includes a concentration of boron trioxide ($B_2O_3$) of at least about 1.0% by mole. The core may consist essentially of silicon dioxide ($SiO_2$) doped with oxides of germanium and of boron.

In yet an additional aspect, a method according to the invention comprises providing a longitudinally extending core member comprising a photosensitive core and a cladding disposed about the core; providing at least one stub; mounting the at least one stub to one end of the core member; disposing a tubular jacket about the core member; forming a plurality of longitudinally extending apertures, each of the apertures extending through the stub and the cladding of the core member, the apertures being disposed in diametrically opposed portions of the cladding; providing two longitudinally extending members having a thermal coefficient of expansion different from the thermal coefficient of expansion of the cladding of the core member; and inserting the two longitudinally extending members into the apertures to thereby form a preform for drawing a birefringent, photosensitive optical fiber. As above, an optical fiber may be drawn from the preform.

Providing the at least one core member may include providing a core member with a tapered end, and forming the at least one stub may include forming at least one receiving portion in the stub to receive the tapered end of the at least one core member. An end face may be prepared on the stub and the tubular jacket after disposing the tubular jacket about the core member. The tubular jacket may be disposed about the core prior to or after mounting the at least one stub to one end of the at least one core member. The core may include a concentration of boron and a concentration of germanium.

In another aspect of the invention, Applicants have discovered that, surprisingly, a polarization-maintaining double-clad (PM DC) optical fiber having good performance can be fabricated without the laborious and time-consuming effort of deliberately introducing non-circularities into one or both of the inner cladding or the stress inducing regions.

Such a fiber can comprise, in certain embodiments, an absorption of pump radiation that is approximately equivalent to that of a fiber incorporating a non-circularity, for example, a fiber having an inner cladding having a non-circular outer perimeter or a non-circularity specifically included as a polarization maintaining feature.

In one embodiment, a PM DC fiber of the invention comprises an axially extending core, which can comprising a rare earth and an index of refraction, and a first cladding disposed about the core. The first cladding can comprise a first index of refraction that is less than the index of refraction comprised by the core. The first cladding can further comprise a predetermined thermal coefficient of expansion (TCE) and a circular outer perimeter. The PM DC fiber can also comprise a second cladding disposed about the first cladding, and the second cladding can comprise a second index of refraction that is less than the first index of refraction comprised by the first cladding. Also included, in this set of embodiments, is at least one axially extending, circular, stress inducing region for making the fiber polarization-maintaining. A pair of these stress-inducing regions can be provided in certain embodiments. At least one stress inducing region (and optionally all, where multiple stress-inducing regions are used) comprises a selected TCE that is different than the TCE of the first cladding, and is spaced from the core. The PM DC fiber can provide an absorption per unit length, at a selected wavelength, that is within 20 percent of the absorption per unit length at that wavelength by a test fiber that is identical to the PM DC fiber except that the outer perimeter of the first cladding of the test fiber is shaped as an octagon. In one embodiment, the absorption per unit length of a fiber according to the invention is within 15 percent of such a test fiber, and in a further embodiment, the absorption per unit length is within 10 percent, or even 5 percent of the absorption provided by the test fiber. The selected wavelength can be the wavelength corresponding to a maxima (which need not be an absolute maxima) in the absorption spectrum of the optical fibers.

In another embodiment, a fiber according to the invention comprises an axially extending core comprising an active material and an index of refraction, where the active material can, responsive to absorbing pump light, provide light having a wavelength that is different than the wavelength of the pump light. The fiber also comprises a first cladding disposed about the core, where the first cladding comprises a first index of refraction that is less than the index of refraction comprised by the core. The first cladding can further comprise a thermal coefficient of expansion (TCE) and can receive the pump light for absorption by the active material. The fiber also comprises a second cladding disposed about the first cladding, where the second cladding comprises a second index of refraction that is less than the first index of refraction comprised by the first cladding. The fiber comprises a pair of axially extending stress inducing regions constructed and arranged to make the fiber polarization-maintaining, where each of the regions has a TCE that is different than the TCE of the first cladding, and each of the regions has a circular outer perimeter and is spaced from the core. The pair of stress inducing regions can cause sufficient scattering of pump light received by the first cladding such that the absorption of pump light per unit length of the fiber is within 15 percent of at least one of the absorption per unit length when the second cladding has a circular outer perimeter and the absorption per unit length when the second cladding has an outer perimeter shaped as an octagon. The outer perimeter of the second cladding is circular can be circular, can be shaped as an octagon, or can have any other shape.

Further advantages, novel features, and objects of the invention will become apparent from the following detailed description of non-limiting embodiments of the invention when considered in conjunction with the accompanying Figures, which are schematic and which are not drawn to scale. For purposes of clarity, not every component is labeled in every one of the following Figures, nor is every component of each embodiment of the invention shown where illustration is not considered necessary to allow those of ordinary skill in the art to understand the invention.

BRIEF DESCRIPTION OF THE DRAWINGS

FIG. 5 is an exploded view, in perspective, of a preform manufactured in accordance with one embodiment of another aspect of the present invention;

FIG. 12A illustrates a non-circular inner cladding design taught in U.S. Pat. No. 4,815,079 issued to Snitzer et al.;

FIG. 12B illustrates a non-circular inner cladding design taught in U.S. Pat. No. 5,533,163 issued to Muendel;

FIG. 12C illustrates a non-circular inner cladding design taught in U.S. Pat. No. 5,864 645 issued to Zellmer et al.;

FIG. 12D illustrates a non-circular cladding design taught in U.S. Pat. No. 6, 157,763 issued to Grubb et al;

FIG. 12E illustrates a non-circular inner cladding design as taught in U.S. Pat. No. 5,949,941 issued to DiGiovanni;

FIG. 12F illustrates a non-circular inner cladding design as taught by U.S. Pat. No. 6,477,307 issued to Tankala et al.

FIG. 12G illustrates a non-circular index modifying region as taught in U.S. Pat. No. 6,483,973 issued to Mazzerese et al.;

FIG. 12H illustrates a polarization-maintaining double-clad fiber having non-circular stress inducing regions, as taught in U.S. Pat. No. 5,949,941 issued to DiGiovanni;

DETAILED DESCRIPTION

An improved article is provided by the present invention wherein an optical fiber may be formed that is both photosensitive and birefringent, such as a fiber that is photosensitive and polarization maintaining.

Figure 1:
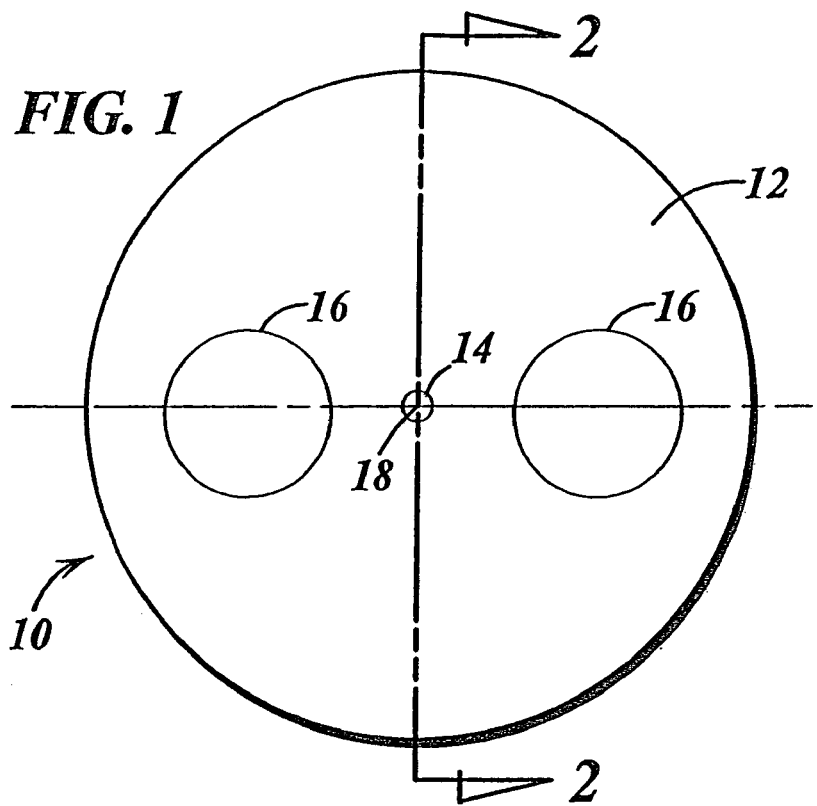
FIG. 1 is an enlarged, cross-sectional view of an optical fiber in accordance with one embodiment of the present invention.

In accordance with one aspect of the present invention, an optical fiber is illustrated generally at 10 in FIG. 1. The optical fiber 10 comprises a cladding 12, which is disposed about a core 14, and at least one longitudinally extending region 16. The cladding 12 and core 14 are illustrated as being in a coaxial relationship, although, it will be appreciated that the core 14 may be offset from a central axis 18 of the fiber 10. "Disposed about", as used herein, means that a cladding or layer surrounds, at least partially, another layer or cladding, and may additionally contact the other layer or cladding, for example, if there are no intermediate layers or cladding interposed between the cladding or layer and the other cladding or layer.

The core 14 guides light propagated by the optical fiber 10. Typically, the core 14 includes an index of refraction that is higher than the index of refraction of the cladding 12 such that light is reflected from the interface between the core 14 and the cladding 12 via the phenomenon of total internal reflection. However, an optical fiber according to the invention may also tend to confine light to the core via Bragg reflection and/or other phenomena, such as is employed, for example, in microstructured and other fiber types, such as fibers that include multiple dielectric layers, or fibers hereinafter developed.

The cladding 12 and/or the core 14 may comprise a glass such as silica. Also, the optical fiber 10 may include an additional cladding and/or a protective coating, such as, for example, a polymer acrylate coating, which may be applied using a die coater as the fiber is drawn and cured by exposure to UV radiation, as is known in the art. A double clad fiber according to the invention may include a second cladding disposed about the cladding 12 and having an index of refraction that is lower than the index of refraction of the cladding 12. The second cladding may be a protective coating that has a sufficiently low index of refraction, such as a low index polymer. Alternatively, the second cladding may be glass and a protective coating may be disposed about the second cladding. As is understood by one of ordinary skill in the art, in a double clad fiber the inner cladding, such as the cladding 12, may serve as a pump cladding for receiving pump radiation for exciting an active material, such as a rare earth dopant, described in more detail below, in the core 14 of the optical fiber 10. The cladding 12 may have a shaped outer circumference, such as an octagon or D-shape. See, for example, U.S. Pat. No. 5,864,645, issued to Zellmer, and which is herein incorporated by reference to the extent necessary to practice the present invention.

It will be understood that various cladding compositions may also be employed in the practice of the present invention, e.g., in order to render the cladding photosensitive and/or vary the refractive index for matching with the longitudinally extending regions as described below. In particular, the cladding may comprise silicon dioxide ($SiO_2$) along with concentrations of one or more of the following dopants: phosphorous (P); fluorine (F); germanium (Ge); boron (B); and aluminum (Al). It will be understood that germanium, when included, is typically present at least as $GeO_2$. Phosphorus, when included, is typically present at least as $P_2O_5$. Aluminum when included is typically present at least as $Al_2O_3$ and boron when included is typically present at least as $B_2O_3$. Preferred examples of suitable ranges of dopants are provided in the following Table. Preferably, silicon dioxide ($SiO_2$) comprises the remainder weight %.

TABLE

| Material | Range in Weight % |
|---|---|
| ($P_2O_5$) | 0.0% to 10.0% |
| (F) | 0.0% to 5.0% |
| ($GeO_2$) | 0.0% to 5.0% |

The core 14 can have a refractive index that is greater than that of the cladding 12 and, in accordance with a feature of the invention, is photosensitive. As described above, a photosensitive fiber is advantageous for, among other things, receiving an index grating, such as a Fiber Bragg Grating (FBG) or a Long Period Grating (LBG), via exposure of the core to a selected pattern of actinic radiation.

The outer circumference of the core 14 is preferably circular, and the core may comprise a compound of silicon dioxide doped with a concentration of germanium, typically in the form of at least $GeO_2$, and a concentration of fluorine. Various materials, such as germanium, are known to be photosensitive, and may thereby provide a means for receiving a refractive index grating. Alternatively or additionally, the cladding 12 may also be photosensitive such that an index grating 22 may also be formed in the cladding 12.

It has been found by the inventors hereof that a core 14 comprised of silicon dioxide ($SiO_2$) doped with a concentration of germanium of at least 10.0% by weight and a concentration of fluorine of at least 0.1% by weight is suitable for practice of the present invention. Preferably, the concentration of germanium ranges from 10.0% and 40.0% by weight and the concentration of fluorine ranges from 0.1% and 5.0% by weight. More preferably, the concentration of germanium ranges from 10.0% and 20.0% by weight and the concentration of fluorine ranges from 0.2% and 3.0% by weight. Preferably, silicon dioxide ($SiO_2$) comprises the remainder weight %. In one practice of the invention, the core of the fiber comprises approximately 16.8 wt % $GeO_2$ and from 1 to 1.3 wt % fluorine. Fiber wherein the photosensitive region, such as, for example, the core of the fiber, comprises greater than 7% by weight of $GeO_2$ can be useful.

As can be seen from the discussion above, a fiber according to the invention typically preferably includes a photosensitive region, such as the core of the fiber, that comprises greater or equal to approximately 75% by weight of silica glass. More preferably, the photosensitive region comprises at least 80% by weight of silica glass.

As is known in the art, germanium raises the index of refraction of a silica host glass and fluorine lowers the index of refraction of a silica host glass. Germanium is also known to be photosensitive. To enhance photosensitivity of the fiber, it can be desirable to incorporate as much germanium as possible into the region of the fiber that is to be rendered photosensitive, e.g., the core. However, a large concentration, desirable for photosensitivity, may raise the index of refraction such that it may be detrimental in certain circumstances. For example, a fiber having a core having a large index of refraction relative to the cladding will have a large numerical aperture. Such a fiber is lossy and does not efficiently transfer light with other optical devices. Accordingly, in one practice of the invention, a material is added that has the opposite effect on the index of refraction, such that more of the photosensitive material, such as germanium, may be added.

Although it is preferred that the photosensitive region of the fiber, such as the core or the cladding, include a material that raises the index of refraction and a material that reduces the index of refraction, it is not necessary to include both materials in the practice of the present invention. As described above, germanium increases the index of refraction and is photosensitive. Accordingly, in one practice, the core can include a high concentration of $GeO_2$, such as a concentration of $GeO_2$ of at least 10% by mole and preferably a concentration of $GeO_2$ of at least 15% by mole and the core is substantially free of index reducing material. The fiber may also have a numerical aperture (NA) of larger than 0.2, and may have a numerical aperture of larger than 0.25. However, in some instances such a numerical aperture is acceptable and even desirable.

It is known in the art that boron is advantageous for enhancing photosensitivity. Furthermore, boron, as an index reducing material, has the additional benefit of also countering the index-raising effect of germanium, allowing more germanium to be incorporated into the fiber, thereby additionally raising the photosensitivity of the fiber. Nevertheless, in one aspect of the invention the fiber includes an index reducing material other than boron. "Other than boron", as used herein, means that the material may reduce the index of refraction of the region of the fiber to which it is added independent of the effect of any concentration of boron that may also be present, such as, for example, in trace amounts.

In considering the problem of providing a photosensitive fiber that is also birefringent, applicants realized that, for example, placing boron in the core may tend to reduce the stress induced on the core by the longitudinally extending regions, and thus decreases the birefringence of the optical fiber. Accordingly, in one practice of the invention, a fiber includes fluorine, which reduces the index of refraction, and germanium, which is photosensitive and which raises the index of refraction, in the core (or cladding) of the optical fiber. The additional stress introduced by the boron, especially when the boron is in or near the core, can make a fiber more difficult to manufacture, as the preform is more prone to shattering during manufacture or subsequent processing. Furthermore, boron can unduly increase the attenuation of an optical fiber, especially when boron is present in the core of the optical fiber or in any region of the fiber that is exposed to light guided by the fiber. Furthermore, the attenuation due to boron varies significantly with the wavelength of the light guided by the fiber, such that a plot of attenuation versus wavelength now has a pronounced slope, which can be detrimental with the operation of many devices into which the fiber is incorporated and that are intended to operate over a band of wavelengths, such as, for example, wavelength division multiplexers (WDM's) and certain types of filters.

In one aspect, an optical fiber according to the invention may be polarization maintaining and highly photosensitive and provide an attenuation of less than 5 dB/km at a wavelength of 1550 nm. More preferably, such a fiber has an attenuation of less than 2.5 dB/km at 1550 nm, most preferably less than 1 dB/km at a wavelength of 1550 nm. Fibers according to the invention meeting one or more of the foregoing attenuations may include concentrations of germanium (e.g., in the form of $GeO_2$) and fluorine recited above.

The foregoing examples using silica, germanium and fluorine are exemplary. Of course, the fiber 10 may include glasses other than silica, and may even comprise other materials, such as polymers. According to the invention, a region of the fiber is photosensitive and includes a material that raises the index of refraction of the core and as well as a material that reduces the index of refraction of the core. One of the foregoing materials typically provides for photosensitive behavior, and it is desirable to incorporate as much as possible of that material into the core or cladding of the fiber. The other material has the opposite effect on the index of refraction, so as to allow more of the first material to be added without an undue effect on the index of refraction of the core, and may or may not be photosensitive.

Figure 2:
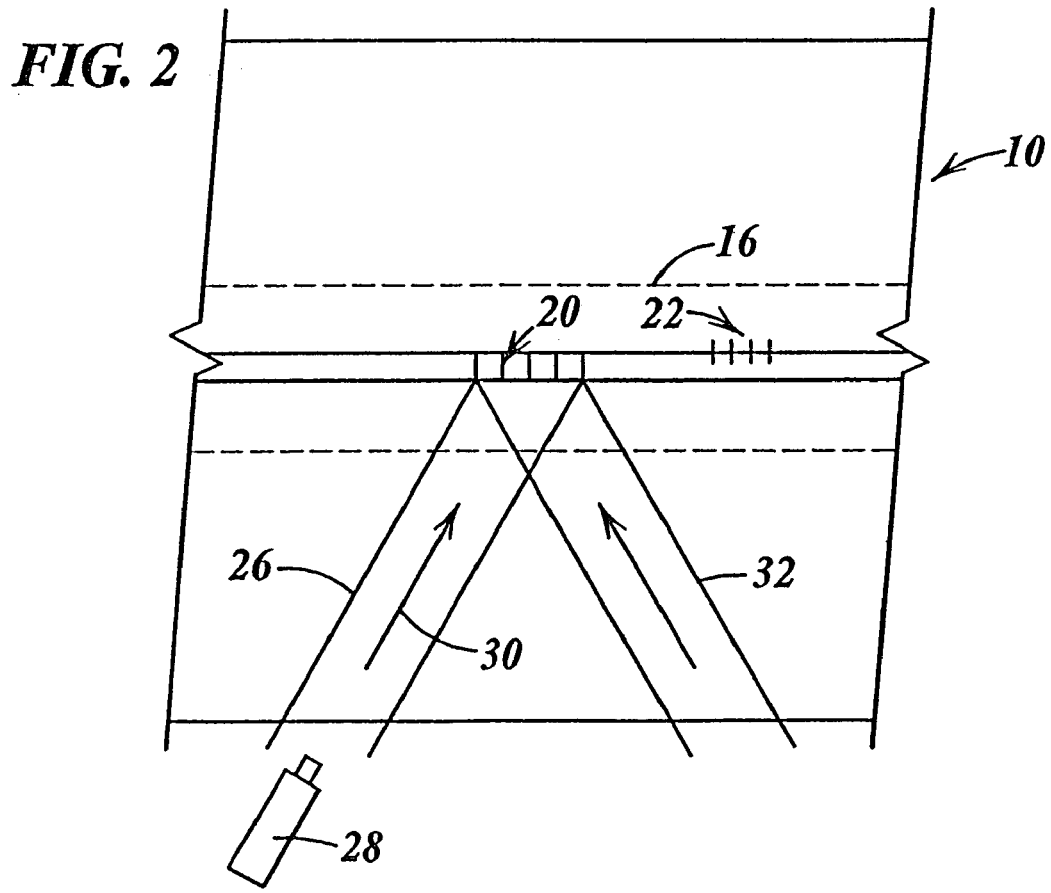
FIG. 2 is a sectional view taken of an optical fiber that includes an index grating, such as a cross section taken along line 2—2 of FIG. 1 wherein an index grating is written into the fiber of FIG. 1.

Various methods of forming an index grating in the optical fiber 10 may be employed in the practice of the present invention. As illustrated in FIG. 2, actinic radiation, such as a beam of ultraviolet light 26 from a laser 28, may be used to write the index grating 20 in the core 14. The laser 28 may be any suitable laser such as an excimer laser and the beam may be directed as shown in the direction of arrow 30. It will also be understood that the index grating 20 may be written to the optical fiber 10 using a phase mask, interferometric techniques, such as would involve the use of two beams 30 and 32, or an amplitude mask. Optionally, it may be written point by point, i.e., one element of the index grating at a time.

Referring again to FIG. 1, the longitudinally extending regions 16 are provided as an example of a means for applying stress to the core 14 to create birefringence in a signal propagated through the optical fiber 10. It will be understood that a single longitudinally extending region 16 may be employed rather than two as illustrated.

In order to create stress in the core 14, the longitudinally extending regions 16 are comprised of a material that has a different thermal coefficient of expansion (below referred to as "TCE") than the TCE of the cladding 12. When such a fiber is drawn from a glass preform, the longitudinally extending regions 16 and the cladding 12 will, during cooling, shrink different amounts. Accordingly, stress is applied to the core 14 whereby birefringence occurs in light propagated by the fiber 10.

It will be appreciated that the TCE of the longitudinally extending regions 16 may either be greater than or less than the TCE of the cladding 12. The longitudinally extending regions may comprise compounds of silicon dioxide ($SiO_2$) including concentrations of the dopant oxides $GeO_2$, $P_2O_5$, $B_2O_3$, $TiO_2$ and $Al_2O_3$. Exemplary combinations of the foregoing dopant oxides include $GeO_2$ and $B_2O_3$ or $P_2O_5$ and $B_2O_3$ or $GeO_2$, $P_2O_5$ and $B_2O_3$. Preferably the longitudinally extending regions may comprise compounds of silicon dioxide ($SiO_2$) including concentrations of the dopant oxide $B_2O_3$.

Figure 3:
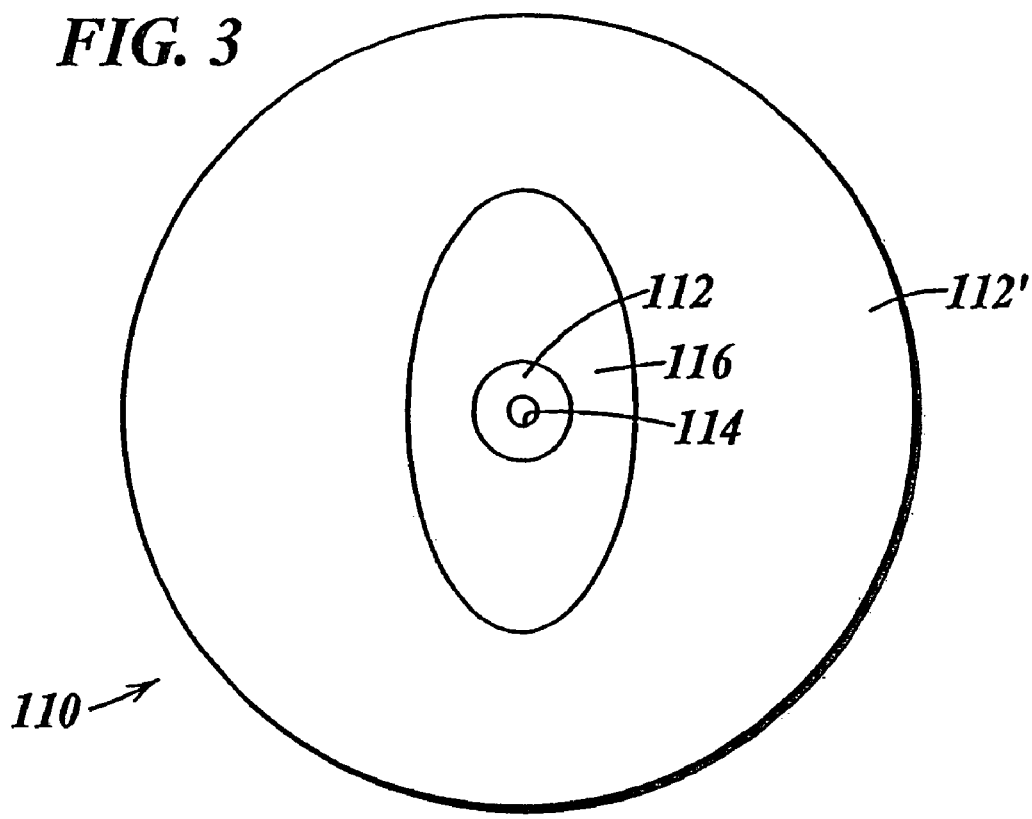
FIG. 3 is an enlarged, cross-sectional view of an optical fiber in accordance with another embodiment of the present invention.

Referring now to FIG. 3, an optical fiber in accordance with another embodiment of present invention is shown generally at 110. In this embodiment, the optical fiber 110 comprises a cladding 112, a core 114 and a single longitudinally extending region 116, which is disposed about the core 114. The material compositions of the cladding 112, core 114 and longitudinally extending region may be similar to those described above regarding the optical fiber 10 (FIG. 1). As described above and in order to create stress within the core 114, the longitudinally extending region 116 has a TCE which is different from that of the cladding 112 or from the additional cladding 112', which may be disposed about the longitudinally extending region 116. One of ordinary skill in the art, apprised of the disclosure herein, understands that much of the foregoing discussion, as well as the discussion below, applies to both the embodiments of the invention shown in FIGS. 1 and 3, although discussion may be in terms of FIG. 1 only.

Figure 4:
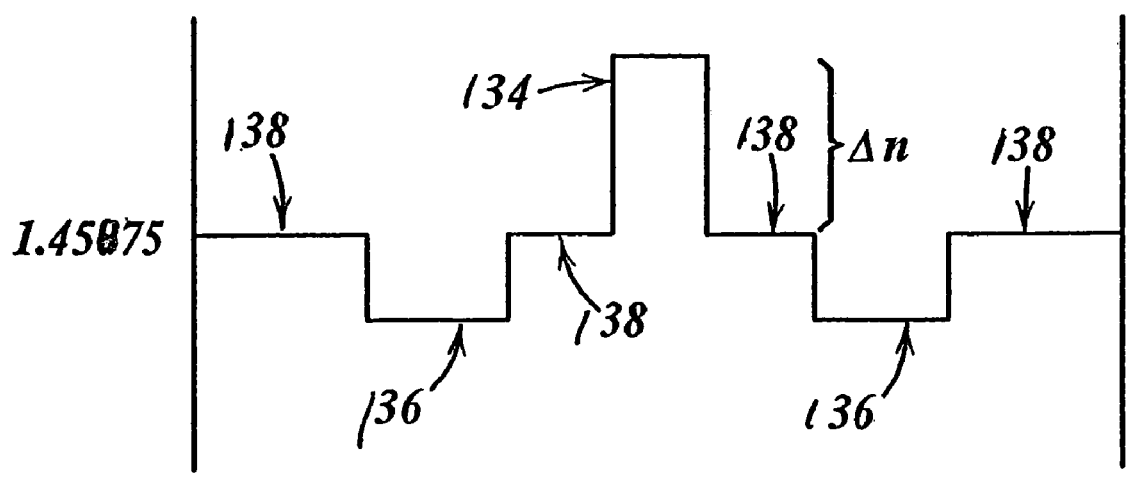
FIG. 4 is a graph plotting a refractive index profile across a cross-sectional portion of an optical fiber according to one embodiment of the present invention.

FIG. 4 illustrates one possible refractive index profile for the optical fiber 10 (or the optical fiber 110 of FIG. 3), where the cladding 12 is silica and has an index of refraction of 1.45875. The refractive index 134 of the core 14 is higher than refractive index 138 of the cladding 12, and typically the refractive indices 136 of the longitudinally extending regions 16 are lower than the refractive index 138 of the cladding 12. Although the core of the optical fiber 10 may be photosensitive, the difference between the refractive index 134 and the refractive index 138, referred to as the "delta n" of the fiber, is typically low enough, due, for example, to the core including index reducing as well as index raising materials, such that the fiber has a numerical aperture of 0.35 or less, and more preferably has a numerical aperture of 0.137 or less, such as a numerical aperture of approximately 0.13.

In one practice of the invention, the refractive indices of the longitudinally extending regions 16 may closely match that of the claddings 12 in order to reduce the likelihood of difficulties in writing a refractive index grating, described above, in the core 14. It will be understood that the term "closely match" refers to refractive indexes that are within approximately 0.25% of each other. Often it is possible to match the refractive indices to within about 0.001 in absolute value.

Also, it is preferable that the longitudinally extending regions or members 16 have a generally cylindrical outer circumference, as shown in FIG. 1. Although a fiber having such cylindrical longitudinally extending regions can be more difficult to manufacture, such a fiber can typically be manufactured such that there is less statistical variation in key dimensions and performance criteria of the fiber, such as, for example, the degree of ovality of the outer circumference of the longitudinally extending regions 16 and the beat length of the optical fiber (a measure of the birefringence of the optical fiber 10). However, it will be understood that other geometrical configurations will be within the scope of the present invention. For example, crescent or "bow-tie" shaped longitudinally extending regions are also known in the art and deemed within the scope of the present invention.

In certain practices of the invention, it can be useful that a fiber include boron. With reference once again to FIG. 1, the core 14 may comprise a compound of silicon dioxide doped with a concentration of germanium, which is typically present in silicon dioxide as one or more oxides of germanium, such as $GeO_2$. The core may additionally comprise a concentration of boron, such as, for example, in the form of $B_2O_3$, which is understood to enhance the photosensitivity of the germanium. Various photosensitive materials are known in the art or may be discovered, and a means for receiving an index grating can include one or more of the foregoing photosensitive materials. Alternatively or additionally, the cladding 12 may also comprise a photosensitive material whereby an index grating 22 may also be formed in the cladding 12. The core 14 may also be generally elliptical in cross section, which can enhance the birefringence of the optical fiber 10. However, in many instances it is highly desirable that the core 14 be as circular as possible. Birefringence can be provided by the longitudinally extending stress inducing regions described elsewhere.

It has been found by the inventors hereof that a core 14 including a region doped with a concentration of germanium of at least 7% by mole and a concentration of boron of at least 1% by mole is suitable for practice of the present invention. More generally, an optical fiber 10 according to the invention includes a region, such as the core 14 or the cladding 12 that comprises a concentration of $GeO_2$ from 7% by mole to 40% by mole. Independent of or in addition to the foregoing, the core or cladding can include a concentration of boron from 1% by mole to 12% by mole. More preferably, the region of the optical fiber 10 comprises a concentration of $GeO_2$ from 10% by mole to 30% by mole. Independent of or in addition to the foregoing, the concentration of $B_2O_3$ is preferably from 2% by mole to 12% by mole. Most preferably, the region of the optical fiber 10 comprises a concentration of $GeO_2$ from 15% by mole to 25% by mole and, independent of or in addition to the foregoing, a concentration of $B_2O_3$ from 3% by mole to 8% by mole.

Examples of various concentrations of germanium and boron that may be used in the practice of the present invention are provided in the Table below.

TABLE

| Number | $GeO_2$ Mol % | $B_2O_3$ Mol % |
|---|---|---|
| 1 | 8.6% | 4.5% |
| 2 | 9.1% | 4.1% |
| 3 | 9.0% | 6.1% |
| 4 | 10.1% | 6.8% |
| 5 | 8.7% | 12.2% |

A fiber according to the invention can include the concentrations noted above in a $SiO_2$ host glass. Most preferably, a core or cladding according to the invention consists of a silica host glass and the materials and concentrations specified, i.e., the fiber core or cladding consists of silica and these dopants exclusively. In many instances certain amounts of other materials may also be included in the makeup of the core or the cladding, but at levels that do not affect the fundamental properties of the fiber presented herein. These amounts have been omitted from discussion above and may be considered to be part of the remainder mole percentage typically attributed to the host glass, such as silicon dioxide ($SiO_2$), such that a fiber according to the invention consists essentially of the materials in the concentrations noted above. As can be seen from the discussion above, a fiber according to the invention typically preferably includes a photosensitive region, such as the core of the fiber, that is greater or equal to approximately 50% by mole of silica glass and that includes boron. More preferably, the photosensitive region is made up of at least 80% by mole of silica glass.

In accordance with another aspect of the present invention, various methods of manufacturing a perform, from which an optical fiber such as optical fiber 10, described above, may be drawn, are illustrated in FIGS. 5 through 11.

Referring to FIG. 5, a preform in accordance with an embodiment of the present invention is illustrated generally at 210. The preform 210 comprises a cladding member 212, a core member 213 including a core 214 and a pair of longitudinally extending members 216.

The cladding member 212 may comprise silica and includes three longitudinally extending apertures 217A, 217B and 217C. The apertures 217A and 217C typically have similar dimensions, such as similar diameters, and are provided for receipt of the longitudinally extending members 216. The aperture 217B is provided for receipt of the core member 213 and typically has a smaller diameter than the diameters of the apertures 217A and 217C. In one practice of the invention, the aperture 217B has a diameter that is 0.250 inches or less, and is typically 0.125 inches or less. The apertures 217A and 217C can have diameters that are greater than 0.250 inches, and that are typically at least 0.5 inches.

The apertures 217A, 217B and 217C may be formed in the preform 210 by any process that forms suitably straight apertures, such as, for example, an acoustic drilling process. One suitable acoustic drilling process has been found to be ultrasonic diamond grinding. This process employs a hollow cylindrical corer that is driven piezoelectrically as it is rotated at speeds up to 8000 rpm in order to cut a hole in the preform. Commercial vendors offer and advertise such a process. It can be useful to anneal the preform prior to forming the apertures, such as by heating the preform in an oven to, for example, 1000° C. and then cooling the preform down. The foregoing annealing cycle of heating the preform, holding the preform at 1000° C. and cooling the preform down can take 30 hours.

The core member 213 comprises the core 214 which may in turn comprise concentrations of germanium and boron, as described above in connection with core 214, and preferably also includes a cladding portion 219 that may comprise silica. The core member 213 may be formed, e.g., by any of the techniques described below including flame hydrolysis. The core member 213 also may be subjected to an appropriate etching procedure in order to remove material from the cladding 219 and thereby reduce a diameter of the core member to an appropriate diameter for insertion into the aperture 217B.

The longitudinally extending members 216 preferably comprise a material that has a TCE that is different from that of the cladding member 212 and cladding portion 219, as described above in connection with longitudinally extending regions or members 216. The longitudinally extending members 216 also may be formed, for example, by one or more of the techniques described herein. The longitudinally extending members 216 also may be subjected to an appropriate etching procedure in order to reduce a diameter of the core member to an appropriate diameter for insertion into the apertures 217A, 217C.

Prior to forming of the longitudinal apertures 217A, 217B and 217C, such as by acoustic drilling, a perpendicular end face 218 is formed on one end of the cladding member 212, such as by machining or grinding. After formation of the apertures, each of the longitudinally extending members 216 and core member 213 may be inserted into the cladding member 212 to form the preform 210. Plugs can be inserted in the apertures at one end of the cladding member 210 to retain the members 213 and 216 from falling out. Optionally, the apertures 217 need not be drilled all the way through the cladding member 210. See the aforementioned '871 patent, column 6, lines 35–52.

As noted elsewhere herein, it is known in the art to form diametrically opposed longitudinally extending apertures in a cladding member having a core. The diametrically opposed apertures receive longitudinally extending regions having a TCE that is different than the TCE of the cladding member to form a preform for drawing a birefringent optical fiber. Reference is again made to the '871 patent, which teaches forming an endface prior to drilling the apertures for receiving the longitudinally extending regions. However, applicants of the present invention consider that forming an endface on a cladding member that includes a core comprising boron causes the core to shatter, rendering the preform useless for further processing. Accordingly, in one aspect of the invention, the cladding member 212 includes the aperture 217B located substantially along the geometric center of a cross section of the cladding member 212, and core member 213 is made separately and inserted into aperture after formation of the end face 218, as described above.

Figure 6A:
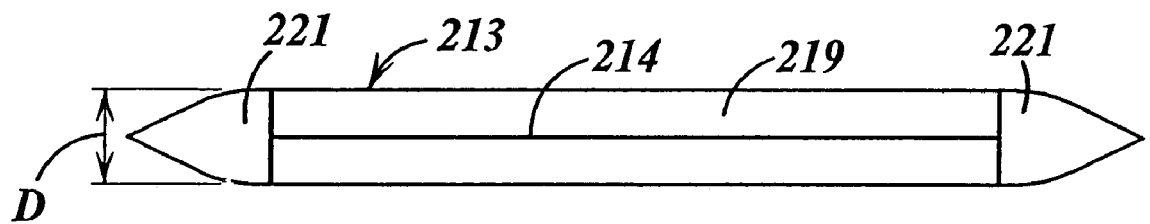
FIGS. 6a–6c are sequential, diagrammatical views illustrating a core member, glass stubs and a tubular jacket in the various stages of manufacture of a preform in accordance with another embodiment of the present invention.
Figure 6B:
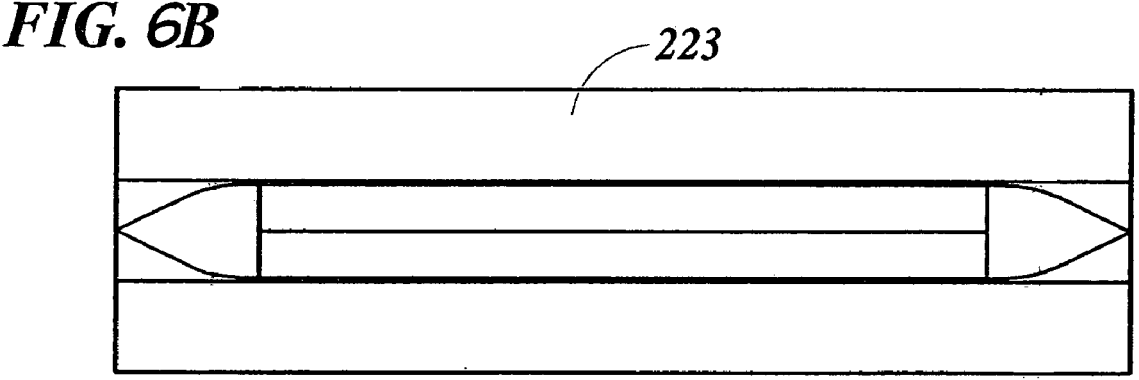
Figure 6C:
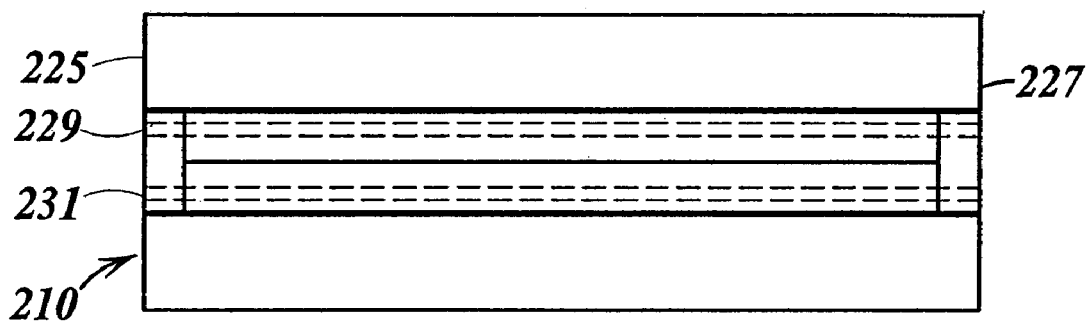

A method of forming a preform in accordance with another embodiment of the present invention is shown in sequence in FIGS. 6A through 6C. In particular, a core member 213 is formed which includes a core 214 and a cladding portion 219 each of which may be similar in composition to those discussed above in connection with FIG. 5. A pair of stubs 221, which may comprise silica, may be mounted to opposing ends of the core member 213.

Further details of applying the stubs 221 to the core member 213 are provided below in connection with FIGS. 6 through 9. A tubular jacket 223, which also may comprise silica, may then be disposed and collapsed about the core member 213 as shown in FIG. 6B. Thereafter, as shown in FIG. 6C, an end face 225 may be prepared for the forming of apertures. This may be accomplished by cutting through the tubular jacket 223 and stubs 221. Longitudinally extending apertures may then be formed, such as by ultrasonic diamond grinding, at 229, 231 wherein longitudinally extending members (not shown) such as described above in connection with FIG. 5, may be inserted. It is considered that appending one or more of the stubs 221 to the core member 219 allows the longitudinally extending apertures 229 and 231 and/or the end face 225 to be formed with far less likelihood of shattering of the core 214. The apertures extend through at least one of the stubs and the cladding of the core member. The stub 221 and the tubular jacket 233 can be added to the core member 213 on a lathe equipped with a torch, as is known in the art. Preferably the stub is a solid cylindrical piece of glass and is of uniform composition throughout.

Returning to FIG. 6A, the core member 213 includes the diameter D. In a preferred embodiment the diameter D is large enough, such as, for example, greater than 1.5 inches, such that the apertures 229 and 231 are formed through the stub and the cladding of the core member. Preferably the diameter D is at least about 2.0 inches. Optionally, the diameter of the core member 213 may be reduced, e.g. via etching, and the apertures 229 and 231 may be disposed in the tubular jacket 223.

Although not shown, it will be appreciated that multiple core members 213 may be formed and arranged end to end with stubs 221 interposed between each end in the form of a series of linked core members in order to reduce manufacturing cost. A length of the tubular jacket 223 may then be increased in order to meet the additional length of the linked core members 219. Each core member 219 would then be separable, e.g., by cutting.

Figure 7:
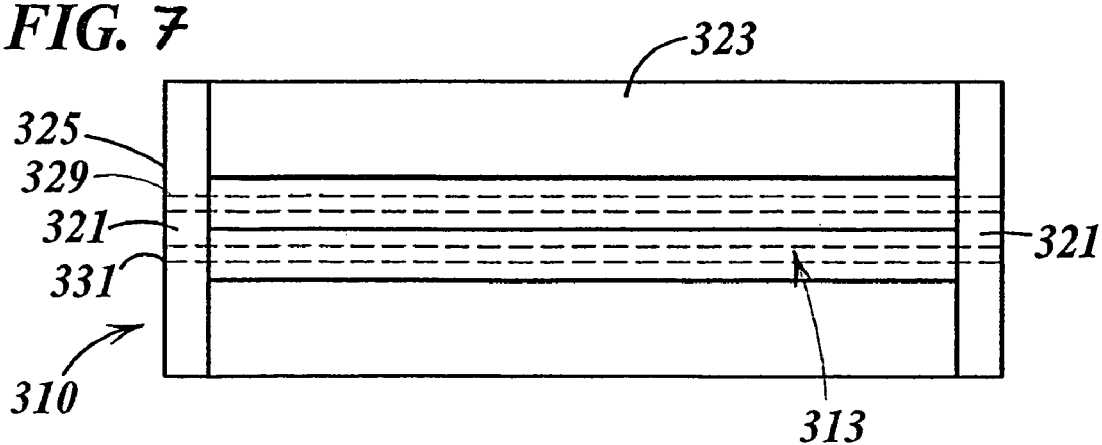
FIG. 7 is a schematic view showing a glass preform having a core member, stubs and a tubular jacket manufactured in accordance with a further embodiment of the present invention.

Referring now to FIG. 7, a method of forming a preform 310 in accordance with another embodiment of the present invention is shown. This method is similar in many respects to that described in connection with FIGS. 6A through 6C excepting that a tubular jacket 323 is located over a core member 313 prior to the mounting of stubs 321 to the core member. Thereafter the endface 325 is formed and the longitudinally extending apertures 329, 331 may be formed in the preform 310.

Figure 8:
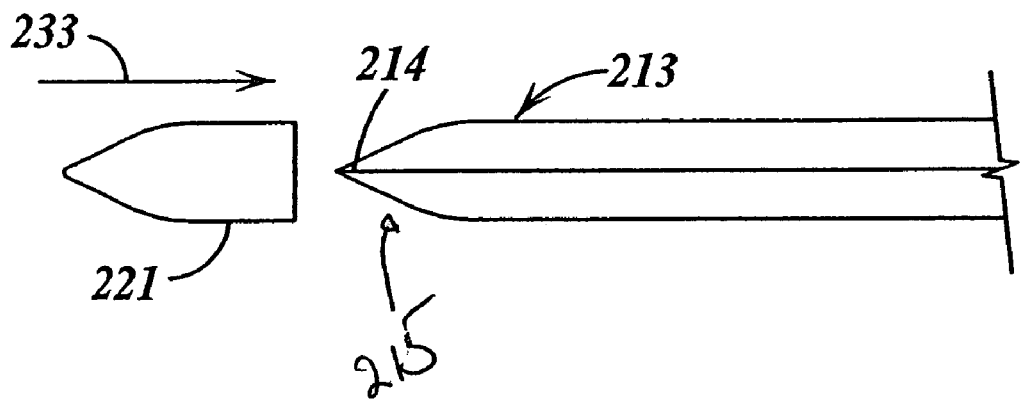
FIG. 8 is a schematic view illustrating one method of applying a stub to a core member.
Figure 9:
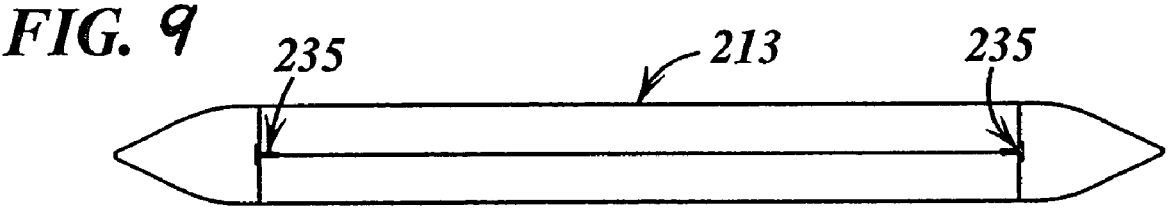
FIG. 9 is a schematic view illustrating a core member formed according to the method of FIG. 8.

Referring now to FIGS. 8 and 9, a method of applying the stub 221 to the core member 213 is illustrated. Typically the core member 213 includes a cone shaped portion 215, which is often formed when the core member 213 is worked on a torch equipped lathe, such as when severing an end of the core member 213 by heating and stretching the core member 213 on a lathe.

To mount the stub 221 to the core member 213, the stub 221 and core member 213 may be heated to an appropriate temperature and then the stub 221 is moved in the direction of arrow 233. The foregoing may be performed on a lathe. This method may cause the formation of "nail head" 235. The term "nail head" refers to the bunching of the core as the cone shaped portion 215 is collapsed.

Figure 10:
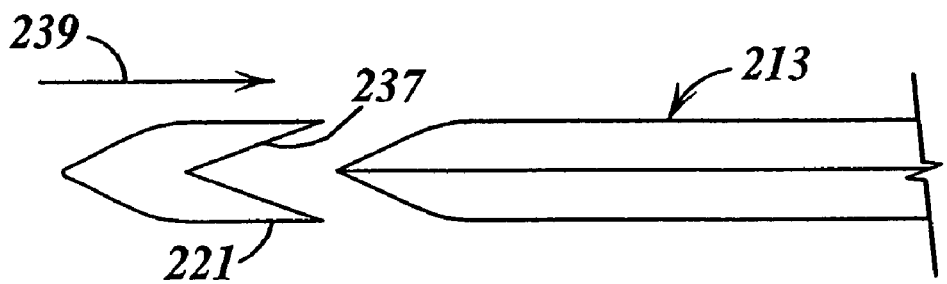
FIG. 10 is a schematic view illustrating another method of applying a stub to a core member.
Figure 11:
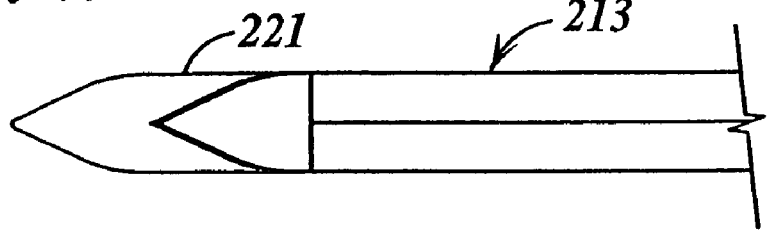
FIG. 11 is a schematic view illustrating a core member formed according to the method of FIG. 10.

As shown in FIGS. 10 and 11, optionally, the stub 221 may be formed to include a receiving portion 237 so that when the stub is moved in the direction of arrow 239 nail heads are not formed. The receiving portion can be formed by machining using an appropriately shaped tool, as is known in the art. The foregoing description of FIGS. 8–11 can also apply to the adding of stubs to form the preform 310, except that the stub 321 is added to both the core member 313 and to the jacket 323.

With reference again to FIG. 1 for purposes of illustration, in one practice of the invention the core 14 preferably supports no more than substantially a few spatial modes, i.e., six modes, of light at the wavelength(s) at which the fiber is intended to operate. In particular, the core preferably supports only a single mode, and has a second mode cutoff wavelength of less than 2000 nm. In one practice of the invention, the core has a second mode cutoff wavelength of less than 1800 nm, and in another practice of the invention, the core has a second mode cutoff wavelength of less than 1200 nm, such as, for example, a second mode cutoff wavelength of less than 980 nm. A second mode cutoff wavelength of about 920 nm can be useful. Second mode cutoff wavelength refers to the wavelength wherein, for wavelengths shorter than the second mode cutoff wavelength, the fiber can propagate more than one mode. A photosensitive and birefringent optical fiber having a cutoff wavelength of less than 980 nm may be particularly useful in stabilizing pump lasers.

Note that the phenomenon of photosensitivity is not very well understood. Incorporating germanium into a fiber, and in particular into a glass fiber, is understood to be one way to provide photosensitivity, especially when the germanium is incorporated as $GeO_2$ in a silica fiber. It has been noted that some small amount of GeO tends to accompany the $GeO_2$, and that the photosensitivity of a fiber may be related to this concentration of GeO. As is known in the art (see, for example, U.S. Pat. No. 5,157,747) some researchers consider that collapsing a preform in a reducing atmosphere can increase the amount of GeO in the resultant fiber drawn from the preform and thus enhance the photosensitivity of the fiber.

It can be helpful to quantify the photosensitivity of a fiber according to certain practices of the invention, given that the prior art may include optical fibers including some nominal photosensitivity and birefringence. Such fibers were not, to the inventors' knowledge, intended to be photosensitive and birefringent, and accordingly dopants are understood to be present in concentrations that provide rather low photosensitivity. Photosensitive fibers are typically now used to write Bragg gratings, often in a production environment, and hence it is highly desirable that a fiber be as photosensitive as possible to reduce the time to write a grating.

The photosensitivity of two fibers is most reliably practically compared by writing identical gratings, using the same writing apparatus and the same writing conditions, into the two fibers and comparing the strength of the gratings written in the fibers. In theory, photosensitivity can be quantified as a change in the index of refraction of the exposed material, and, for exposure to light of a selected wavelength, this change is a function of the power per unit area and the period of the time over which the material is exposed. However, such comparisons are difficult, as it is difficult to quantify reliably one or more of the foregoing parameters. It is more reliable and more common to compare the strengths of written reflective Bragg gratings. One such prior art fiber useful for the foregoing comparison is a fiber wherein the nominally photosensitive region consists of silica doped with no more than 7 mole % $GeO_2$, such as, for example, the polarization maintaining fiber described in U.S. Pat. No. 4,478,489 wherein the core is the nominally photosensitive region.

In such a practical comparison, the more photosensitive a fiber, the "stronger" the grating written into the fiber (assuming that the gratings are not written into the fibers so as to induce Type II behavior in the fiber, as discussed in more detail below). A stronger grating reflects more of the light that is propagating along the fiber than a weaker grating, and hence will have a higher insertion loss than the weaker grating (power that is reflected is not transmitted, leading to a higher transmission, or insertion, loss.). For example, a grating that reflects 80% of the incident power at the wavelength of operation of the grating transmits approximately 20% of the incident power and will provide an insertion loss of approximately 7 dB. A stronger grating, such as a grating that reflects 90% of the light propagating along the fiber transmits only 10% of the power and has an insertion loss of approximately 10 dB.

Accordingly, in certain practices of the invention for a grating that is between 80% and 90% reflective written into a prior art fiber, an identical grating written under identical conditions into a fiber according to the invention transmits at least 50% less power than the fiber of the prior art, and accordingly is a stronger grating having a higher (at least 3 dB) insertion loss. The prior art fiber must of course also meets all other limitations recited in a particular claim at issue in order for the comparison to be even necessary. Gratings can be written to be maximally reflective at about 1550 nm when making the foregoing comparison.

Note that some fibers, such as fibers co-doped with boron and germanium, can exhibit what is known as Type II behavior. Type II fibers are so photosensitive such that exposure to actinic radiation for excessive times or power density levels can cause the grating strength to actually decrease from peak strength initially obtained. If in the foregoing comparison the writing conditions for prior art fiber are such that the more photosensitive fiber according to the invention would enter the Type II regime, then the strength of the fiber according to the invention should be ascertained at the peak, and not in the Type II regime. This is not difficult, as typically grating strength is monitored as the grating is written, such as a function of time of exposure or of the number of light pulses, if a pulsed light source is used.

An entire region of a fiber according to the invention need not be photosensitive. For example, a portion of the fiber can be photosensitive, such as, for example, an annulus or ring that separates at least part of the core from at least part of the cladding. Often, for example, it is desirable to suppress cladding modes, and only an annulus of the cladding, typically an inner annulus that can optionally contact the core, need be photosensitive. As another example, an outer ring of the core can be photosensitive. This latter configuration has been found to be useful when the core includes rare earth materials, and particularly when the core is co-doped with erbium and ytterbium as described below, such as in a laser or amplifier.

In one aspect of the invention, the numerical aperture of the fiber, which is a function of the difference between the indices of refraction of the core and the cladding and hence of the materials included in the core and the cladding, is less than 0.35; in a more preferred aspect, the numerical aperture is less than 0.25; and in a most preferred aspect, the numerical aperture is less than 0.18. One useful numerical aperture according to the invention is approximately 0.13, such as, for example, 0.13 plus or minus 0.003. Another useful numerical aperture with a less demanding tolerance is 0.13 plus or minus 0.01. In some instances, where a high numerical aperture can be advantageous or tolerated, the photosensitive region of the fiber need not include a concentration of boron, and can include germanium or another photosensitive index raising dopant without also including a concentration of boron, which is an index reducing dopant and which, accordingly, tends to lower the numerical aperture of the region of the fiber that includes the concentration of boron.

In certain applications multimode fibers and/or fibers having rather low numerical apertures can have advantages. For example, it is desirable to increase the power handling capability of optical fibers, and in particular to increase the power handling capability of fibers that are used in fiber lasers and fiber amplifiers. Unfortunately, nonlinear processes, such as stimulated Brillouin scattering (SBS) and stimulated Raman scattering (SRS) are responsible, in large part, for limiting the power handling capability of fibers and hence the power output of fiber lasers and amplifiers. Though these processes are complex, each can be reduced by limiting the power density in the core of the fiber. This can be accomplished by using a larger core fiber that in addition has a lower numerical aperture, such that the fiber has a larger mode field diameter. Essentially, the power of the light propagating along fiber is more spread out, such that the power density in any given area of the fiber is reduced. Fibers having large core diameters support multiple spatial modes. The presence of such modes tends to degrade the quality of the light provided by the fiber. One useful technique described in U.S. Pat. No. 6,496,301, issued on Dec. 17, 2002 to Koplow, Kliner and Goldberg, involves coiling a fiber having a low NA and a large core to filter out, via bend loss, the higher order modes such that the fiber operates in a single mode. Such a technique allows higher power operation of the fiber while maintaining the quality of the light provided by the fiber.

Thus in one aspect of the present invention the numerical aperture of the fiber is no greater than 0.13; in another aspect of the present invention the numerical aperture of the fiber is no greater than 0.11; and in yet a further aspect the numerical aperture is no greater than 0.09. It can be advantageous that the numerical aperture be as low as 0.06. In a certain practice of the invention the numerical aperture is no greater than 0.06. It can be useful that the numerical aperture of a fiber according to the invention is from 0.06 to 0.09.

A fiber according to the invention, in addition to being birefringent and photosensitive, can have a core that is designed to support substantially more than a few modes of light. The core can have a V number of greater than 4 at an operating wavelength of the fiber. The core can have a V number of greater than 10 at an operating wavelength of the fiber. The core of a fiber according to the invention can have a core having diameter of at least 25 microns; in another practice, the core can have a diameter of at least 50 microns; in an additional practice, the core can have a diameter of at least 100 microns.

As taught in the '301 patent, fibers combining low numerical apertures and multimode cores can be particularly advantageous, and any combinations of one of the foregoing stated ranges for numerical aperture with one of the foregoing stated ranges for the fiber V number and/or with one of the ranges for core diameter of the fiber are deemed within the scope of the invention.

As noted elsewhere, in a preferred embodiment a fiber according to the invention and including one or more features noted in the foregoing paragraphs, the fiber includes a pair of space longitudinally extending regions that are diametrically opposed about the core of the fiber and that each have a substantially circular outer circumference.

As one of ordinary skill in the art is aware, there exists a considerable body of knowledge regarding the fabrication of birefringent optical fibers, including detail regarding the fabrication and composition of the longitudinally extending regions 16 or preform members that will become the longitudinally extending regions 16, 116 (FIGS. 1 and 2). In light of that established body of information, and the general discussion given below regarding the established body of knowledge relating generally to fabricating optical fibers, additional discussion is not included here. See, for example, the following U.S. patents: U.S. Pat. No. 4,395,270, entitled "Method Of Fabricating A Polarization Retaining Single-Mode Optical Waveguide", issued on Jul. 16, 1983 to Blankenship et al.; U.S. Pat. No. 4,478,489, entitled "Polarization Retaining Single-Mode Optical Waveguide", issued on Oct. 23, 1984 to Blankenship et al.; U.S. Pat. No. 4,561,871, entitled "Method Of Making Polarization Preserving Optical Fiber", issued Dec. 31, 1985 to Berkey; and U.S. Pat. No. 5,152,818, entitled "Method of Making Polarization Retaining Fiber", issued Oct. 6, 1992 to Berkey et al. The disclosures of the foregoing '270, '489, '871 and '818 patents are incorporated herein by reference to the extent necessary to understand and/or practice the present invention.

Note that the cladding member 110 can include materials other than silica. See, for example, U.S. Pat. No. 4,664,473, entitled "Optical Fiber Formed Of $MgO$—$AL_2O_3$—$SIO_2$ Glass", issued May 12, 1987 to Gannon, and herein incorporated by reference to the extent necessary to understand and/or practice the present invention.

"Beat length" is a measure of the birefringence of an optical fiber and is related to the stress imposed on the core by the longitudinally extending regions, as is known in the art. Preferably, a photosensitive optical fiber according to the invention has a beat length at a wavelength of 1550 nm of less than 100 mm; more preferably, this beat length is less than 25 mm; and most preferably this beat length is less than 10 mm.

The rare earths are important materials that can be added to an optical fiber according to the invention. Rare earths, responsive to being pumped by light of a first wavelength, coherently emit or amplify light of a second wavelength, and accordingly can be used in fibers to make fiber lasers or amplifiers. The wavelength of the pump light is typically shorter than the wavelength of the light being amplified or emitted. The second wavelength is typically the wavelength at which the fiber is intended to operate, which can be determined by the emission and/or the absorption spectra of the particular rare earths in use. Erbium is the most popular rare earth in the industry and in one practice of the invention the fiber (e.g., the core) includes a concentration of erbium. The erbium can be co-doped with a concentration of ytterbium. Such co-doping can increase the pump efficiency of a laser or amplifier. Often aluminum and/or phosphorus are included with the erbium and ytterbium. The rare earths are generally understood to include atomic numbers 57–71 on the periodic table, which numbers include lanthanum, cerium, praseodymium, neodymium, promethium, samarium, europium, gadolinium, terbium, dysprosium, holmium, erbium, thulium, ytterbium and lutetium. Materials that can be included with the rare earths include aluminum, which can broaden the bandwidth of resultant fiber device, increase the solubility of the rare earth in a host glass of the fiber, or improve the distribution of the rare earth in the fiber for reducing physical clumping and/or concentration quenching. Other materials that can be used in conjunction with the foregoing rare earths include, but are not limited to, aluminum, boron, germanium, phosphorus, tellurium, antimony and yttrium. See also U.S. Pat. No. 4,666,247, entitled "Multiconstituent Optical Fiber", and issued May 19, 1987 to MacChesney et al. The foregoing '247 patent is incorporate by reference herein to the extent necessary to understand and/or practice the present invention.

Double-clad optical fibers, discussed briefly above, are now considered in more detail. Double-clad fibers are well known in the art and are increasingly used in amplifiers and light sources, and in particular can form the basis of a high power laser light source. A double-clad optical fiber typically includes a core comprising a rare earth, a first, or inner, cladding surrounding the core and a second, or outer, cladding surrounding the first cladding. The index of refraction of the core is higher than the index of refraction of the inner cladding, which is in turn higher than the index of refraction of the outer cladding. Because light reflects from a boundary between regions having different indices of refraction and, more importantly, can totally reflect from a boundary to a region having a lower index of refraction, light introduced into the core tends to be confined to the core via reflection at the boundary of the core and the lower index inner cladding. Similarly, "pump" light introduced to the inner cladding tends to be confined to the inner cladding via reflection from the boundary of the inner cladding and the lower index outer cladding (but can penetrate the core, which has a higher index than the inner cladding).

In a typical practice, a light signal propagates along the core, while "pump" light is introduced into and propagates along the inner cladding, and penetrates into the core as well. Responsive to receiving pump light of a first "pump" wavelength from the inner cladding, the rare earth emits light having a second wavelength that is different than the first wavelength. The light having the second wavelength can be an amplified information or other signal received by the fiber or can be laser light generated (or even amplified if a seed laser beam is provided) by the double-clad fiber.

Double-clad fibers are useful because they allow pump light to be more easily introduced to the core, as compared to single-clad fibers, and hence absorbed by the rare earth. The pump light can be introduced to the large (compared to the core) inner cladding and will intersect the core as it propagates down the inner cladding and reflects, due to the difference in the indices of refraction of the inner and outer claddings, from the boundary between the inner cladding. The absorption of the pump light by the fiber, typically measured in per unit length of the fiber, such as in dB/meter, is a useful figure of merit for a double-clad fiber. A high absorption per unit length of the fiber is desirable, and, for a given concentration of the rare earth, indicates more interaction between the rare earth and the pump light.

Figure 12A:
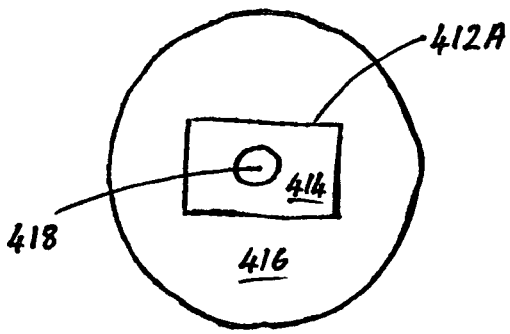
FIGS. 12A–12H schematically illustrate prior art double-clad fibers including non circular regions for scattering pump light so as to enhance the intersection of the pump light with the core, and more particularly.

The first double-clad fibers (see, for example, U.S. Pat. No. 3,808,549, issued to Maurer) comprised a circular core, a circular inner cladding and a circular outer cladding, and provided rather low absorption per unit length of the fiber. Elias Snitzer was one of the first researchers to realize that this low absorption was due largely to skew modes having light rays that can spiral down the inner cladding, near the boundary between the inner and outer claddings, without intersecting the core. Snitzer further discovered that breaking the circular symmetry of the boundary between the inner cladding and the outer cladding scattered the skew rays, reflecting them toward the core, considerably enhancing the intersection of the pump light with the core and leading to a much improved absorption per unit length. With reference to FIG. 12A, Snitzer disclosed in U.S. Pat. No. 4,815,079 a rectangular shaped boundary 412A between the inner cladding 414 and the outer cladding 416. Many other patents followed, and designs taught in many of these patents are shown in FIGS. 12B–12H, where reference numeral 418 represents the core, and reference numerals 414 and 416 represent the inner and outer claddings, respectively. These designs are now quickly reviewed.

Figure 12B:
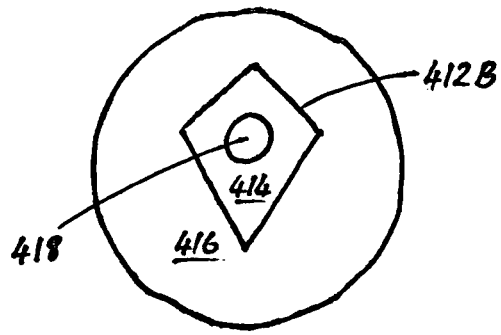
Figure 12C:
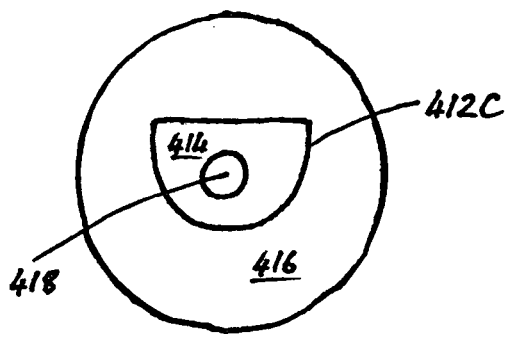
Figure 12D:
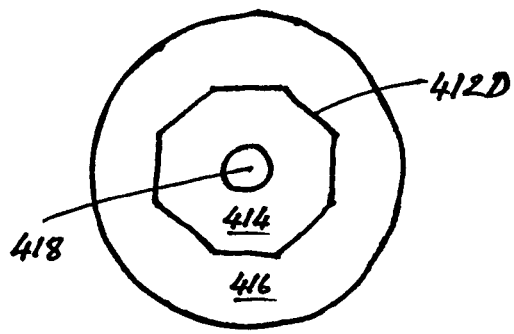
Figure 12E:
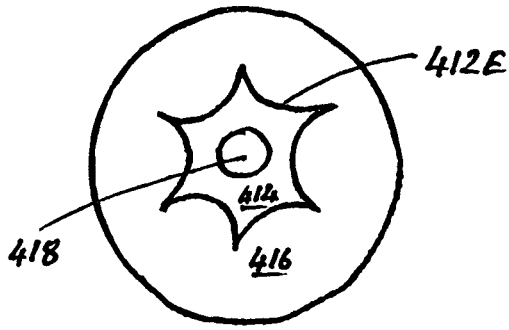
Figure 12F:
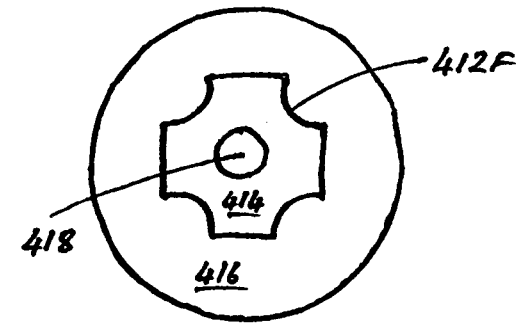

FIG. 12B illustrates the non-circular inner/outer cladding boundary (quadrangular) 412B taught in U.S. Pat. No. 5,533,163 issued to Muendel; FIG. 12C illustrates the non-circular boundary (D-shaped) 412C taught in U.S. Pat. No. 5,864,645 to Zellmer et al.; FIG. 12D illustrates the non-circular boundary (octagonal) 412D taught in U.S. Pat. No. 6,157,763 to Grubb et al.; FIG. 12E illustrates the non-circular boundary (star shaped) 412E taught in U.S. Pat. No. 5,949,941 to DiGiovanni; and FIG. 12F illustrates the non-circular boundary (flats and inwardly curved sections) 412F taught by U.S. Pat. No. 6,477,307 to Tankala et al.

Figure 12G:
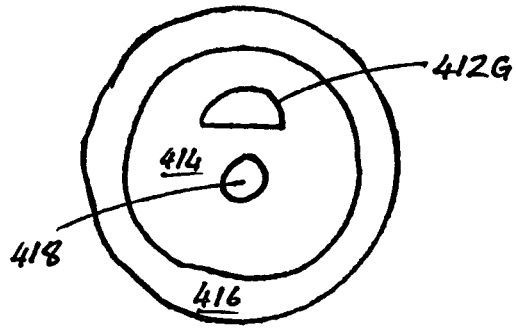
Figure 12H:
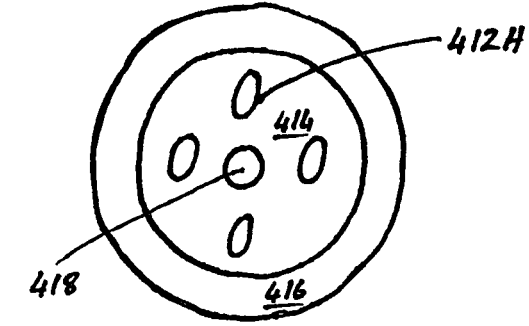

It also known in the art to scatter pump light by positioning regions having a different index of refraction than the inner cladding so as to scatter the skew rays. See, for example, FIG. 12G, illustrating the non-circular index modifying region (crescent shaped) 412G, included within the inner cladding, taught in U.S. Pat. No. 6,483,973 to Mazzerese et al. and FIG. 12H illustrating the non-circular stress inducing regions (amorphous or egg shaped) 412H in a polarization-maintaining double-clad fiber taught in U.S. Pat. No. 5,949,941 to DiGiovanni. The stress inducing regions also serve to stress the core of the fiber to provide a polarization-maintaining feature.

The foregoing FIGS. 12A–12H represent prior art that emphasizes the need for a non-circular boundary between two regions having different indices of refraction (e.g., between the inner cladding and the outer cladding, or with reference to FIGS. 12G and 12H, between index modifying or stress-inducing regions, respectively, and the inner cladding) to vigorously scatter the skew rays at high angles to enhance the intersection of pump light with the core.

DiGiovanni '941 discloses a polarization-maintaining double-clad fiber. Polarization-maintaining double-clad (PM DC) optical fibers can find use in devices that benefit from the use of polarized light. As understood by one of ordinary skill in the art, light propagating along a fiber comprises an electric field with an amplitude oriented transverse to the direction of light propagation; polarization refers to the direction along which the electric field is orientated. The electric field can be orientated along the fiber's horizontal axis (horizontally polarized light) or along the vertical axis (vertically polarized light), or can have an overall orientation that is a combination of orientations along each of the axes.

Unfortunately, it can be difficult and time-consuming to introduce a non-circularity to a region of an optical fiber. For example, creating a non-circular inner cladding can require grinding the preform (a cylindrical member from which the optical fiber is drawn) to the desired shape prior to drawing the fiber from the preform, as well as careful control of the draw parameters (e.g., temperature) so as to preserve the shape as the glass melts in the draw furnace. Often the fiber must be drawn at a reduced temperature to prevent glass flow which, due to the natural surface tension of the glass, tends to return the ground shape to a circular shape. Fiber drawn at a lower temperature can be of inferior quality having, for example, a lower tensile strength.

In addition, an optical fiber having a non-circularity can be more difficult to splice to other optical fibers using an automated splicer, which images the fibers to precisely align the fibers responsive to the image. Splicers can be confused by non-circular features, and thus fail to optimally align the fibers, resulting in a higher splice loss. Non-circularities can also cause problems in measuring the refractive index of the preform prior to drawing the fiber, which is also an automated procedure, and is performed to help ensure that the drawn fiber will conform to the desired specifications.

Although the numerous prior art patents noted above represent an advance in the art, there is clearly room for improvement. Accordingly, in one aspect the present invention can provide an improved polarization-maintaining double-clad optical fiber.

Figure 13:
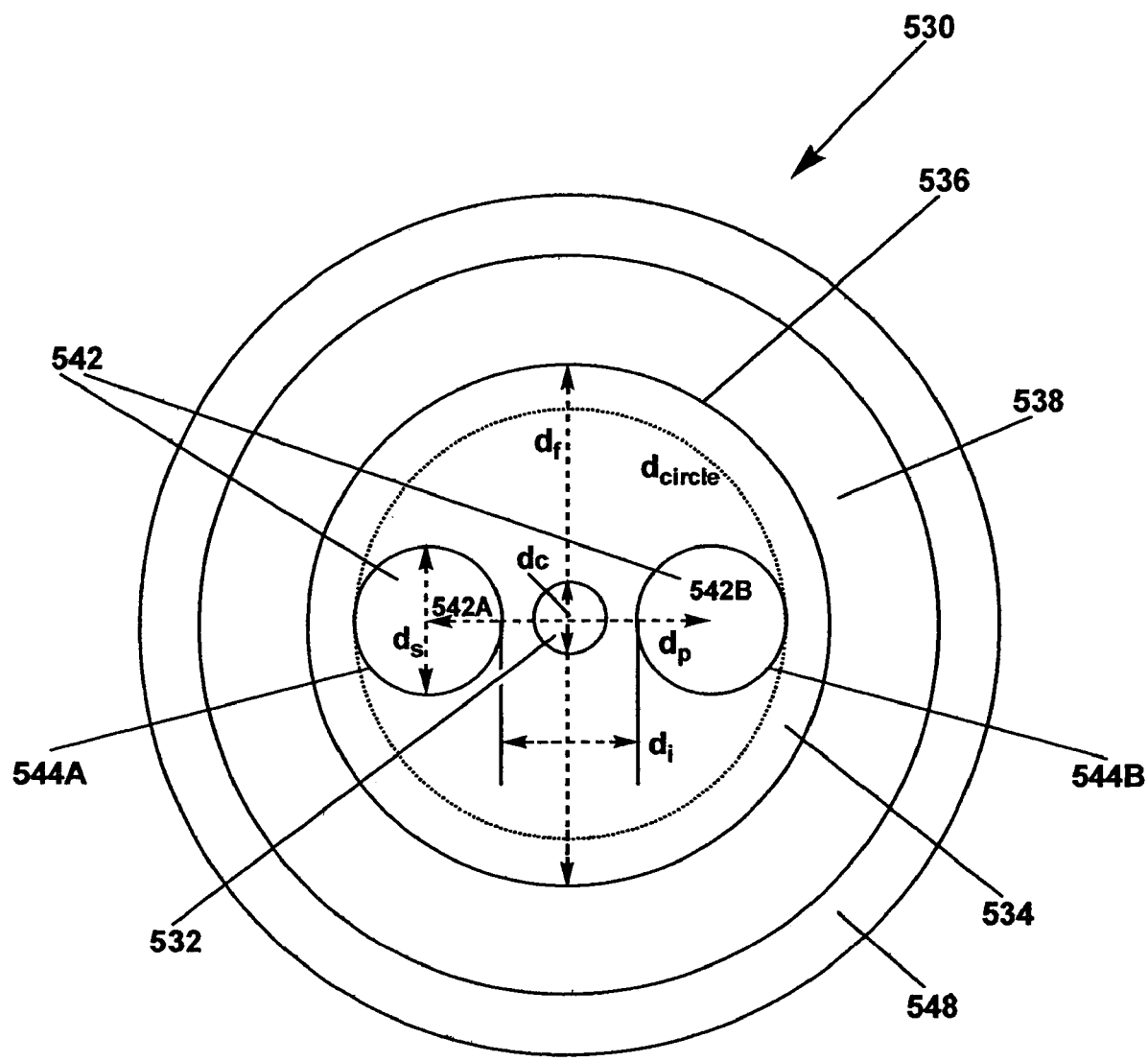
FIG. 13 schematically illustrates a cross-section of one example of a polarization-maintaining double-clad fiber according to the present invention.

FIG. 13 schematically illustrates a cross-section of one embodiment of an improved polarization-maintaining double-clad (PM DC) optical fiber 530 according to the present invention. The optical fiber 530 comprises an axially extending core 532 that can comprise a rare earth, such as a rare earth selected from the Lanthanide (atomic number 57–71) series of the periodic table, and a selected index of refraction. The first, or inner, cladding 534 is disposed about the core 532. The first cladding 534 comprises a first index of refraction that is less than the selected index of refraction comprised by the core 532. The first cladding 534 can also comprise a predetermined thermal coefficient of expansion (TCE). Note that the cladding 534 is preferably circular, that is, the cladding 534 comprises the circular outer perimeter 536. The second cladding 538 is disposed about the first cladding 534 and comprises a second index of refraction that is less than the first index of refraction comprised by the first cladding 534. The fiber 530 can optionally comprise an additional region 548, disposed about the second cladding 538, and which can comprise a protective polymer layer, such as a hard polymer, and/or can comprise a third cladding comprising a third index of refraction that is less than the second index of refraction. "Disposed about", as used herein, means that a cladding or layer surrounds, at least partially, another layer or cladding, and may additionally contact the other layer or cladding, if there are no intermediate layers or claddings interposed between the cladding or layer and the other cladding or layer (which may be present, in embodiments not illustrated).

The fiber 530 further comprises a pair of axially extending stress inducing regions, to be referred to in general by reference numeral 542 and individually by reference numerals 542A and 542B, as shown in FIG. 13. Note that each of the stress inducing regions, 542A and 542B, are circular, that is, each comprises a circular outer perimeter 544A and 544B, respectively. Each of the stress inducing regions 542 comprises a selected TCE that is different than the predetermined TCE comprised by the first cladding 534 for inducing stress in the core 532 causing the fiber 530 to have appropriate polarization-maintaining properties. In one embodiment, the stress inducing regions are diametrically opposed about the core 532, as shown in FIG. 13. In alternate embodiments, one or more stress inducing regions are spaced from the core 532. Stress inducing regions need not be used in pairs, and even when two are used, they need not be diametrically opposed about the core 532. Several dimensions are noted in the embodiment of FIG. 13. For example, the core has a diameter $d_c$; the stress inducing region 542A has a diameter $d_s$, which in the embodiment shown in FIG. 13, is equal to a diameter of the stress inducing region 542B. Alternatively, the stress inducing regions can have unequal diameters. In the embodiment illustrated, the pair of stress inducing regions are spaced by the distance $d_t$ and the centers of the stress inducing regions 542A and 542B are spaced by the dimension $d_p$; and the inner cladding 534 has a diameter $d_f$. Note that the stress inducing regions 542 can be just circumscribed by a circle sharing a center with the center of the core, and having diameter $d_{circle}$, where the circumscribing circle just touches at least one of the stress inducing regions 542. For the embodiment of the invention shown in FIG. 13, the circumscribing circle has the diameter $d_{circle}=d_t+2d_s$.

In one embodiment of the invention, $d_f$ is about 125 microns; in another embodiment of the invention, $d_f$ is at least 200 microns; in an additional embodiment of the invention, $d_f$ is at least 300 microns; and in yet a further embodiment of the invention $d_f$ is at least 400 microns. The foregoing values and ranges for $d_f$ can be combined with the values for $d_c$ provided above in the Summary section of the present disclosure.

According to another aspect of the invention, a fiber, such as, for example, the fiber described above, can comprise a core having a fundamental mode having a selected (e.g., enlarged) mode field area. An enlarged mode field area can help the fiber more readily handle high power, such as by delaying the onset of nonlinearities such as stimulated Brillouin scattering (SBS) and stimulated Raman scattering (SRS). In one embodiment of the invention, an optical fiber comprises a fundamental (i.e., lowest order) mode having a mode field area (at wavelength that is less than 2000 nm) that is at least 20 microns. In another embodiment, the mode field area is at least 30 microns or even greater than or equal to 100 microns. More specific examples are given below.

In another aspect, a fiber according to the invention can comprise one or both of a lower numerical aperture and a larger core diameter, each of which can help contribute to a larger mode field area of the fundamental mode.

In one embodiment, the core of a fiber according to the present invention comprises a numerical aperture of no greater than 0.12; in another embodiment, the core comprises a numerical aperture that is no greater than 0.09; in yet a further embodiment, the core comprises a numerical aperture that is no greater than 0.06, and the numerical aperture can even be less than 0.06, such as, for example 0.05. One useful range for fiber according to the invention is a numerical aperture from 0.05 to 0.09.

The core of a fiber according to the invention can comprise a variety of diameters, and in one embodiment has a diameter of at least 15 microns; in another embodiment the core of a fiber according to the invention comprises a diameter of at least 25 microns; in yet an additional embodiment the core comprises a diameter of at least 50 microns. Certain fibers according to the invention can comprise a core having a diameter of at least 75 microns or even at least 100 microns.

A fiber according to the invention can be single mode at an intended wavelength of operation, which can be a wavelength of about 2000 microns or less, and can be, in certain practices of the invention, a wavelength of about 1 micron or a wavelength of about 1.5 microns. When the fiber comprises a rare earth, the wavelength of operation often includes the wavelength at which a rare earth emits light responsive to being pumped by the pump light, which has different wavelength. The core can be designed to be single mode at both (i.e., pump and emission) of the foregoing wavelengths, or multimode at one wavelength and single mode at the other wavelength, or multimode at both wavelengths.

In one embodiment, a fiber according to the invention comprises a V number of 2.405 or less at a wavelength of operation, which can be, for example, a wavelength of 2000 microns or less. In another embodiment, the fiber comprises a V number of greater that 2.405; in another embodiment, the fiber can comprise a V number of greater than 2.0, or even greater than 4.0. In one embodiment considered particularly useful, the fiber comprises a V number of greater than 4.0 at a wavelength of 1.06 microns.

If the diameter of the core of the fiber and/or the numerical aperture of the fiber are such that higher order modes are present at the intended wavelength of operation (i.e., the fiber is multimode and has a V number of greater than 2.405), the higher order modes can be suppressed, if desired (so as, for example, to provide a higher beam quality) using a technique such as, for example, that taught in U.S. Pat. No. 6,496,301, issued on Dec. 17, 2002 to Koplow et al. and entitled "Helical Fiber Amplifier". The Koplow '301 patent teaches coiling a fiber to radius wherein the higher order modes experience a large bend induced propagation loss and the loss experienced by the fundamental mode remains acceptably low. See also U.S. Pat. No. 5,818,630, entitled "Single Mode Amplifiers And Compressors Based On Multimode Fibers", issued on Oct. 6, 1998 to Martin E. Fermann and Donald J. Harter.

It is known in the art that light scattering from the boundary between any stress inducing regions and the first cladding, due to the difference in refractive indices comprised by the stress inducing regions and the first cladding, can promote to some extent the intersection of the pump light with the core. However, what is known and would be expected by those of ordinary skill in the art does not account for the surprising results realized by the fiber of the present invention. Without wishing to be bound by any theory, Applicants consider that another phenomenon may be contributing to the scattering of pump light, and be responsible, at least in part, for the good performance of the present invention having circular, as opposed to non-circular, regions. Applicants consider that the stress induced in the inner cladding by the stress inducing regions, which causes the index of refraction of the inner cladding to change responsive to the local value of the stress (but without an actual physical boundary between different regions of the fiber), is also scattering pump light. Applicants consider that the extent to which the induced stress could contribute to scattering was heretofore unappreciated in the prior art.

All combinations of the parameters recited herein, such as, for example, numerical apertures, core diameters, V numbers, birefringences and the like, are considered within the scope of the present invention. One of ordinary skill in the art, apprised of the present disclosure and the existing art, can select a numerical aperture and a core diameter to achieve a desired mode field diameter and/or a selected V-number at a selected wavelength.

As noted above, a PM DC fiber of the present invention can include a rare earth (in addition to other materials). For example, the core and/or the cladding can include the rare earth. The rare earths can be selected by those of ordinary skill in the art of the field of pumped fibers, for example from the Lanthanide group of elements in the periodic table (materials having the atomic numbers 57–71). Very useful rare earths known in the art include lanthanum, erbium, ytterbium, neodymium and thulium. As is also known in the art, it can be advantageous to include other materials with the rare earths, to adjust the bandwidth of the gain or absorption spectrum of the fiber or to facilitate the incorporation of higher concentrations of the rare earth dopants by, for example, reducing the clustering of the rare earth(s). Aluminum is known to be useful for helping to incorporate additional rare earth into the fiber. Materials can also be added for providing a selected index of refraction. Useful materials, typically added as dopants, include germanium, fluorine, phosphorous, boron and titanium. See for example, U.S. Pat. No. 4,666,247, issued on May 19, 1987 to Mac-Chesney et al. It can be useful to co-dope the fiber with two or more rare earths, such as, for example, erbium and ytterbium.

One technique found useful by the present Applicants for providing an optical fiber involves providing an axially extending preform member that comprises a core region and a cladding region and drilling axially extending circular holes, such via an ultrasonic technique, through the preform member. Circular stress rods, which will be drawn into the stress inducing regions 542, are fabricated separately and inserted into the drilled holes to form a preform assembly that can be drawn into a PM DC fiber, with the second cladding being added to the drawn fiber as a low index polymer coating. If it is desired that the second cladding 538 comprises a glass, the preform assembly can be upjacketed with a suitable substrate tube to prior to being drawn. In general, see U.S. Pat. No. 4,561,871, entitled "Method of Making Polarization Preserving Optical Fiber", which describes a similar technique. It can be advantageous to "pre-gob" the preform assembly prior to drawing the optical fiber therefrom. In light of the considerable knowledge in the art regarding fabricating stress inducing regions 542 and polarization-maintaining fibers, additional detail is not provided here.

Typically the core 532 and first cladding 534 comprise a host glass, such as a silica host glass, that is doped with appropriate dopants and/or the rare earth noted above, such that the core 532 and the inner cladding 534 comprise the desired indices of refraction. The inner cladding 534 can often be derived in large part from a substrate tube having an inside surface onto which material that will form the core 532 can be deposited via a vapor deposition process, such as the well-known Modified Chemical Vapor Deposition (MCVD) process. In one embodiment of the invention the first cladding 534 comprises substantially pure silica glass, consists of silica glass, or consists essentially of silica glass, and the second cladding 538 can comprise a glass, such as, for example, a silica glass that is down doped with fluorine (or boron) so as to have a lower index of refraction than the inner cladding 534. The second cladding can be derived in whole or in part from a down-doped substrate tube, such as a commercially available fluorosilicate substrate tube, that is collapsed onto a preform member that includes material to form the inner cladding 534. Holes are then drilled, as noted above, stress rods inserted into the holes, and the optical fiber 530 is then drawn. The second cladding 538 can also comprise a polymer, such as a low index fluorinated polymer, that is disposed about the inner cladding 534 as a coating using a die coater mounted on the draw tower, as is known in the art.

As understood by one of ordinary skill in the art, in light of the disclosure presented herein, there are statistical process variations associated with the manufacture of all articles. Optical fibers are no exception. Accordingly, any of a circular core, a circular inner cladding, or a circular stress inducing region may not be perfectly circular, but may be subject to some deviation from a perfect circle that is understood and accepted in the art as within the ambit of the term "circular". Certain regions of a fiber are of course more difficult to manufacture than others, and have smaller process variations known and accepted as being associated therewith. Stress inducing regions can be particularly difficult to manufacture, and larger variations are experienced, mainly due to high stress inherent in the stress inducing regions. A figure of merit (FOM) of the circularity of a region of an optical fiber, such as a stress inducing region, can be defined as follows:

$$FOM = (1 - (\text{Max. diameter} - \text{Min. diameter})/(\text{Avg. diameter})) \times 100$$

The FOM can be determined by measuring many diameters across a stress inducing region so as to find the maximum and minimum diameters. Accordingly, in one embodiment of the invention, circular, in the context of a stress inducing region, means a circular shape with an FOM of at least 90 percent; in another embodiment of the invention, a circular stress inducing region comprises an FOM of at least 95 percent; and in yet an additional embodiment of the invention a circular stress inducing region comprises an FOM of at least 97.5 percent. The foregoing is not meant to limit circular stress inducing regions to be only those having an FOM of at least 90 percent.

As noted above, prior art exists that emphasizes scattering skew modes of the pump light by introducing a non-circular boundary between regions having different indices of refraction, such as between the inner and outer claddings, 414 and 416, respectively, of FIGS. 12A–12F, or between an index modified region 412G and the inner cladding 414, as shown in FIG. 12G, or between a stress inducing region 412H and the inner cladding 414, as shown in FIG. 12H. Without wishing to be bound by any particular theory, Applicants consider that another phenomenon may be more significant than previously appreciated, and may be responsible for a fiber having at least one circular stress inducing region 542 and/or a circular inner cladding 534 (with reference to FIG. 13) being able to provide an excellent absorption of pump radiation. One aspect of this additional phenomenon may be that the stress inducing regions 542 induce enough stress in the inner cladding 534, as well as in the core 532, to vary locally the index of refraction of the inner cladding 534 so as to effectively contribute to mixing or scattering the skew cladding modes. Applicants consider that it was heretofore unappreciated that this additional phenomena can provide sufficient additional scattering wherein a fiber having circular stress inducing regions 542 and a circular inner cladding 534 can provide absorption comparable to that of a test fiber identical in all respects except that the outer perimeter of the inner cladding is non-circularly shaped to scatter pump light, such as by being shaped as a octagon.

The birefringence of a PM fiber comprising stress inducing regions is a measure of the stress induced in the core and hence of the stress also induced in the inner cladding. Birefringence is a measure of the extent of the de-coupling of the horizontal and vertical polarizations. The stress in the core causes the core to have a slightly different index of refraction for each of the polarizations, such that the wavelengths and/or phase velocities of the light waves of each of the polarizations are different, and light of one polarization does not as readily couple into the other polarization due to imperfections in the fiber, or bends, or the like. In one aspect, a fiber according to the invention provides a birefringence of at least $1 \times 10^{-4}$; in another aspect, a fiber according to the invention provides a birefringence of at least $2 \times 10^{-4}$; in yet another aspect, an optical fiber according to the invention provides a birefringence of at least $3 \times 10^{-4}$. Certain birefringence values found to be useful include $1.5 \times 10^{-4}$, $2.3 \times 10^{-4}$, and $3.5 \times 10^{-4}$.

The birefringence is a function of the diameter of the stress inducing regions, $d_s$, the proximity of the stress inducing regions to the core $(d_f - d_c)/2$, and the difference between the TCE of each of the stress inducing regions 542 and the TCE of the regions of the fiber surrounding stress inducing regions 542 such as, for example, the TCE of the inner cladding 34. Increasing the diameter $d_s$, decreasing spacing between the stress inducing regions and the core 532, $(d_f - d_c)/2$, and increasing the difference between the TCE of the stress inducing regions 542 and the TCE of the inner cladding 534 all increase the birefringence, as well as the stress induced in the core. As is well understood by one of ordinary skill in the art, the stress inducing regions typically comprise one or both of boron and phosphorous, typically in the form of $B_2O_3$ and $P_2O_5$, respectively, although other dopants can be used. Both can help to provide a TCE be that is different than the TCE of the cladding or other region of the fiber that surrounds the stress inducing regions. Accordingly increasing the amount of boron and/or phosphorus comprised by the stress inducing regions typically increases the birefringence of the optical fiber. The stress regions can also include germanium, and aluminum, typically in the form of $GeO_2$ and $AlO_2$ respectively, as is known in the art.

Because phosphorus and boron have opposite effects on the index of refraction of a host glass, such as a host glass that comprises silica, the stress inducing regions 542 can comprise an index of refraction that can be selected independently of the TCE of the stress inducing region. Although Applicants consider that the stress induced in the cladding by the stress inducing regions 542 contributes more than appreciated previously to the scattering of the pump light, it can also be advantageous in promoting scattering to maintain a sufficiently large difference between the indices of refraction comprised by the stress inducing regions 542 and the index of refraction comprised by the inner cladding 534. Preferably, the stress inducing regions 542 have an index of refraction that is lower than the index of refraction of the inner cladding 534 such that the stress inducing regions 542 do not act as cores that can guide light. Suitable index differences between one or both of the stress inducing regions 542 and the inner cladding 534 can range from 0.005 to 0.015. One typical index difference found to be useful is about 0.01.

As noted above, DiGiovanni '941 discloses a PM DC optical fiber. However, DiGiovanni '941 emphasizes throughout the specification that the stress inducing regions must be significantly non-circular. See again FIG. 12H above, clearly showing non-circular stress inducing regions 412H, and which corresponds to the original FIG. 3B filed with the patent application that matured into DiGiovanni '941. DiGiovanni '941 thus comports with the conventional wisdom that a non-circular boundary is required between regions having different indices of refraction to promote adequate scattering of pump light. DiGiovanni is understood to teach away from the present invention.

U.S. Pat. No. 6,483,973, entitled "Cladding Member for Optical Fiber and Optical Fiber Formed with the Cladding Member", issued to Mazzarese et al. (Mazzarese '973) teaches a double-clad optical fiber comprising axially extending "index modified" regions that scatter pump light so as to enhance the intersection of the pump light with the core, and hence the absorption of the pump light by any rare earth in the core. The index modified regions are included in the inner cladding, and can comprise suitable dopants (germanium, phosphorous aluminum, etc.) that serve to appropriately modify the index of refraction of the index modified regions so as to differ from the index of refraction of the inner cladding. Mazzarese '973 discloses index modified regions having several different shapes, including circularly-shaped index modified regions. Mazzarese '973 also notes that if an index modified region includes high enough concentrations of certain dopants, the index modified region can create a stress region surrounding the index modified region where the index of refraction of the inner cladding is varied due to stress. However, Mazzarese '973 teaches that the physical extent of any stress field should be minimized, such as by locating the index modified regions far from the core, such that the polarization properties of light traveling in the core of the fiber are not affected. Accordingly, Mazzarese '973 teaches away from a PM DC fiber of the present invention. See Mazzarese '973 at column 5, lines 44–48 and at column 5, line 67 and column 6 lines 1–5. See also FIG. 5B of Mazzarese '973.

Returning to a consideration of FIG. 3, in one embodiment of the invention, $d_{circle}$ is no greater than 80% of $d_f$ (i.e., $d_{circle}$ is no greater than $0.8 d_f$); in another embodiment of the invention, $d_{circle}$ is no greater than 70% of $d_f$, and in yet a further embodiment of the invention $d_{circle}$ is no greater than 60% of $d_f$, and can even be no greater than 50% of $d_f$. In other embodiments of the invention, $d_{circle}$ can be at least 80% of $d_f$, at least 70% of $d_f$, at least 60% of $d_f$, or at least 50% of $d_f$.

The relationship between $d_f$ and $d_{circle}$ can depend, at least in part, on the stress field created in the inner cladding 534, and hence on the difference between the TCE comprised by the stress inducing region(s) 542 and the TCE comprised by the inner cladding 534, which is one of the factors that contributes to the birefringence of the optical fiber.

A general overview of the various techniques that can be employed to fabricate a fiber according to the invention is now presented. As is well understood by those of ordinary skill in the art, one technique for fabricating an optical fiber includes first making a preform and drawing the optical fiber from the preform. The preform can be made in parts (e.g., core members, cladding member, longitudinally extending members, and the like, as noted above). A preform is a member (typically a cylinder) that can be heated at one end so as to cause the glass to flow such that it can be drawn, or pulled, into an optical fiber. The optical preform is typically a scaled up model of the optical fiber, and includes a core and cladding which become the core and cladding, respectively, of the resultant drawn optical fiber. Considerable care is taken in fabricating the preform to the ensure that the relative dimensions of the core and cladding, as well as the composition of the core and cladding, correspond to the desired dimensions and corresponding composition of the optical fiber to be drawn from the preform.

Fiber is typically drawn from the preform by mounting the preform atop a draw tower. As understood by one of ordinary skill in the art, a typical draw tower includes a high frequency induction furnace or a resistance furnace for heating one end of the preform. A spool pulls the fiber from the heated end of the preform and the fiber is wound onto the spool. A diameter measuring element can be included for measuring the diameter of the fiber, and appropriate feedback loops that maintain the desired diameter by adjusting one or more of 1) the rate at which the preform is fed into the furnace; 2) the tension with which the fiber is pulled; and 3) the temperature of the furnace. A coating apparatus can be provided for applying a protective coating to the outside of the fiber, and an ultraviolet curing station for curing the coating before the fiber is wound on the spool. Apparatus for monitoring the thickness and/or the concentricity of the protective coating is also usually included. The protective coating is typically a polymer acrylate. Draw tower technology is well understood by those of ordinary skill the art and further detail is not included here.

A preform can be made by a variety of suitable methods, including vapor phase methods such as outside vapor deposition (OVD), Modified Chemical Vapor Deposition (MCVD), Chemical Vapor Deposition (CVD) and Vapor Axial Deposition (VAD) and combinations thereof. Vapor phase methods usually employ suitable gas precursors that are introduced to a hot substrate, a hot zone, or directly into a flame. The latter technique is known as flame hydrolysis. In the flame hydrolysis technique, precursor gases are introduced to a flame to form soot that is deposited on a surface of substrate, such as on the inside, outside or end of a tube or rod. The soot is subsequently heated and sintered using an oven or furnace. The tube or rod can form a part of the resultant optical fiber preform, or can be removed. The OVD and VAD processes typically involve flame hydrolysis. In other vapor phase techniques, such as CVD and MCVD, precursor gases are introduced to a hot zone and/or a heated substrate, which can again be a tube or rod. One supplier of MCVD lathes and of draw towers is Nextrom Technologies of Finland. Nextrom Technologies has a U.S. office located at 1650 Satellite Boulevard, Duluth, Ga. 30097.

The technique known as "solution doping" can also be used to introduce materials into an optical fiber preform. In solution doping, soot is deposited on a substrate, and the soot is impregnated with a fluid precursor before sintering the soot into glass. Soot can be produced by one or more of the foregoing techniques, with modification when necessary to avoid contemporaneous sintering of the soot into glass. For example, MCVD can be used to deposit soot by reducing the temperature of the heating torch such that soot is deposited but not sintered on the inside of the substrate tube. The tube is then placed in a solution that includes fluid precursor materials, such as, for example, erbium chloride, that impregnates the porous soot. Subsequent drying, oxidation of the erbium and sintering of the soot provides a glass that includes $Er_2O_3$, as very desirable dopant for amplifying or generating light using an optical fiber. The solution doping technique can be used to incorporate a variety of other materials into an optical fiber preform. Solution doping can be used to introduce material into the preform that are otherwise difficult to introduce using standard vapor techniques, such as many of the rare earths. Solution doping is typically used to introduce rare earth and other dopants into the preform core.

Also known in the art are Sol-Gel techniques, wherein a suitable solution is cast in a mold and then gelled, removed and sintered to provide a glass article that can be part or all of a preform. For example, in one embodiment of the invention, the mold could include provision for forming the longitudinally extending apertures that will receive the stress inducing regions and the core of the resultant optical preform.

Aerosol techniques are also known in the art and may be suitable for practicing the present invention.

Each of the foregoing techniques can include one or more overjacketing steps wherein a member formed by one of the foregoing techniques is overjacketed with a glass tube that will typically form additional cladding. Glass tube and rods suitable for deposition of soot, the deposition of glass, or for use as an overjacket are available from Heraeus Amersil, Inc. 3473 Satellite Blvd., Duluth, Ga. 30096. The glass rods and/or tubes can include various types of glasses, such as, for example, silica glass, borosilicate glass, a fluorinated silica glass, a phosphate glass and other types of glasses.

Rods and tubes can also be made by casting molten glass into appropriate molds. For example, one technique for providing a tube is to cast molten glass into a mold that is spun on a lathe. Centrifugal force causes the molten glass to press outward against the walls of the mold such that the glass cools to form a tube.

Typically, a preform is a solid cylinder of glass made using one or more of the techniques described above. However, one or more of the foregoing techniques can be used to make glass members that are assembled together to form a preform. For example, it is known to insert selected rods inside tubes, without necessarily fusing the rods to the tubes, and to draw such a preform into a fiber. The rod-in-tube method can be used, for example, to fabricate microstructured fibers wherein the cladding includes a longitudinally extending array of features that alter the characteristics of the cladding (such as providing a photonic bandgap or lowering the average index of refraction of the cladding) such that light tends to be confined to the core. A vacuum can be applied to the assembly during drawing fiber from the preform.

The preform or one of more of the members included in the preform can be shaped, such as by grinding, so as to provide a desired geometrical feature in resultant drawn fiber.

Techniques are known for fabricating an optical fiber without a preform. For example, the nested crucible technique is one of the older techniques known for forming an optical fiber. A first crucible containing molten glass that will form the cladding of the fiber is disposed about a second, inner crucible that contains molten glass that will from the core of the optical fiber. The crucibles include concentric openings from which the molten glass flows to form the optical fiber, with the opening of the second inner crucible being inside of the opening of the outer crucible. The nested crucible technique is not always favored, as impurities from the crucibles can be introduced into the glass fiber. However, the nest crucible technique is well established and has been used extensively, especially in the formation of non-oxide multicomponent glass fibers. The crucibles are heated to turn glass powder placed into the crucible into the molten glass that exits the apertures to form the optical fiber. Considerable care can be exercised in preparation of the glass powder, just as considerable care is exercised in the preparation of the preform.

Most typically, silica is the host glass of the optical fiber or preform, to which other materials are added. Common dopant materials used with silica include aluminum, boron, fluorine, germanium, phosphorus, titanium, the rare earths (such as, for example, erbium, ytterbium and lanthanum) and transition metals, which can be used to provide selected attenuation. However, other types of glass, such as, for example, chalcogenide glass, ZBLAN glass, phosphate glass, fluoride glass, germanium based glass and the like, as well as any of the single crystal or polycrystalline materials such as thallium bromoiodide, germanium, zinc selenide, and the like, may be found suitable. By way of example, and not of limitation, an optical fiber according to the invention may comprise any of these or other materials, or variants thereof, singly or in combination for the core, cladding or other layers.

Working Example

Figure 14:
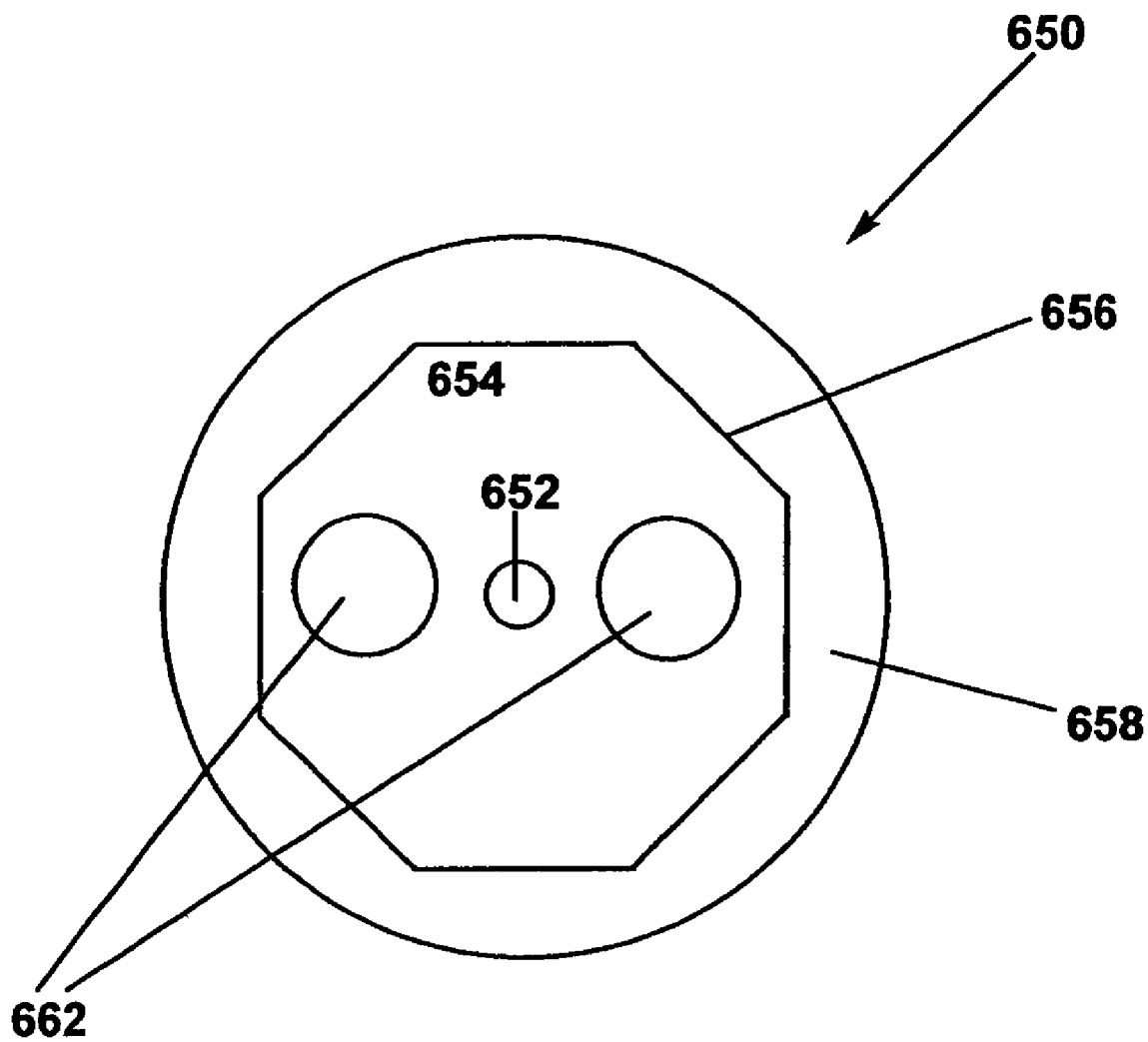
FIG. 14 schematically illustrates a cross-section of a conventional polarization-maintaining double-clad fiber that was used as a comparison with the fiber of FIG. 13.

As noted above, Applicants have discovered that a fiber comprising a circular first cladding 534 and at least one circular stress inducing region, such as the example shown in FIG. 13 with two stress-inducing regions 542A and 542B, can provide excellent absorption of pump light by the rare earth. Applicants constructed a test fiber having the geometry shown in FIG. 14 and which was identical in all respects to a fiber having the geometry shown in FIG. 13 except that the test fiber comprised an inner cladding having an outer perimeter in the shape of an octagon. The octagon is a shape known in the art to effectively scatter pump light so as to provide effective intersection of the pump light with the core for providing high absorption by the rare earth comprised by the core of the pump light. See, for example, the aforementioned Grubb '763 patent and FIG. 12D of the present disclosure. The test fiber 650 comprises the core 652, inner cladding 654, a pair of axially extending circular stress inducing regions 662 and a second cladding 658. Note that the outer perimeter of the inner cladding 654 is shaped as an octagon, as indicated by reference numeral 656.

The first fiber of the invention and the comparative test fiber were single-mode, silica based fibers, formed and drawn conventionally. Each included a core diameter $d_c$ of approximately 5 microns. The cores 532, 652 had a step index of refraction profile relative to the cladding. The cores 532, 652 included about 7.5 weight percent germanium (most of which is in the form of $GeO_2$), 1.45 weight percent ytterbium, and 0.7 weight percent aluminum, with the remainder weight percent being silica, and had a numerical aperture of about 0.15. The inner claddings 534, 654 had a diameter $d_f$ of approximately 125 microns (measured from a flat side to an opposing flat side for the octagon 656 of FIG. 14). The second claddings 538, 658 were defined by a low index fluorinated polymer that was applied as a coating using a die coater on the draw tower used to draw the fiber. The fluorinated polymer is commercially available and provides a numerical aperture of about 0.46 relative to pure silica. The fibers 530, 650 had a second mode cutoff wavelength of about 950 nm. The inner claddings 534, 654 were made of substantially pure (i.e., undoped) silica, and were derived in large part from a substrate tube having the core deposited inside via the Modified Chemical Vapor Deposition (MCVD) process. With reference to FIG. 13, each of the stress inducing regions of the pairs 542, 662 had a diameter $d_s$ of about 37 microns, and each was made of borosilicate glass having approximately 22 weight percent boron, presumably in the form of $B_2O_3$, with the remainder weight percent being largely silica. The stress inducing regions were spaced apart by a $d_p$ of about 57 microns. The birefringence of the fibers was in the range of $3.3 \times 10^{-4}$. The stress inducing regions 542, 662 had an index of refraction that was lower by about 0.01 than an index of refraction of the claddings 534, 654.

The performance of two test fibers and two fibers according to the invention were compared. The absorption of each of the fibers was measured using the cutback method and a Nettest (formerly Photon Kinetics) Model 2400 test bench. The Model 2400 includes a light source having wavelengths spanning 700 nm to 1700 nm. A positionable grating allows selection of a particular wavelength from the source, and optics are provided such that a beam having a selected spot size can be provided to a fiber under test. The Model 2400 includes detectors that can measure the light received from a fiber under test.

The inventive and test fibers included ytterbium, which has at least two absorption maxima of particular interest. One of the two maxima is at located at 915 nm and the other at 975 nm. To reduce measurement error using the experimental setup of the Applicants, the comparison between the inventive and test fiber was made at or near 915 nm. The core and inner cladding of one end of a selected length of the fiber under test were illuminated with 915 nm light, and the light emanating from the other end detected so as to provide a measurement of the attenuation of the light by the fiber. The fiber was then cut back to a shorter length, and the measurement repeated. The difference in attenuations measured is due to the absorption by the ytterbium. The cutback method is well known in the art and helps eliminate errors due to reflections and the like.

Figure 15:
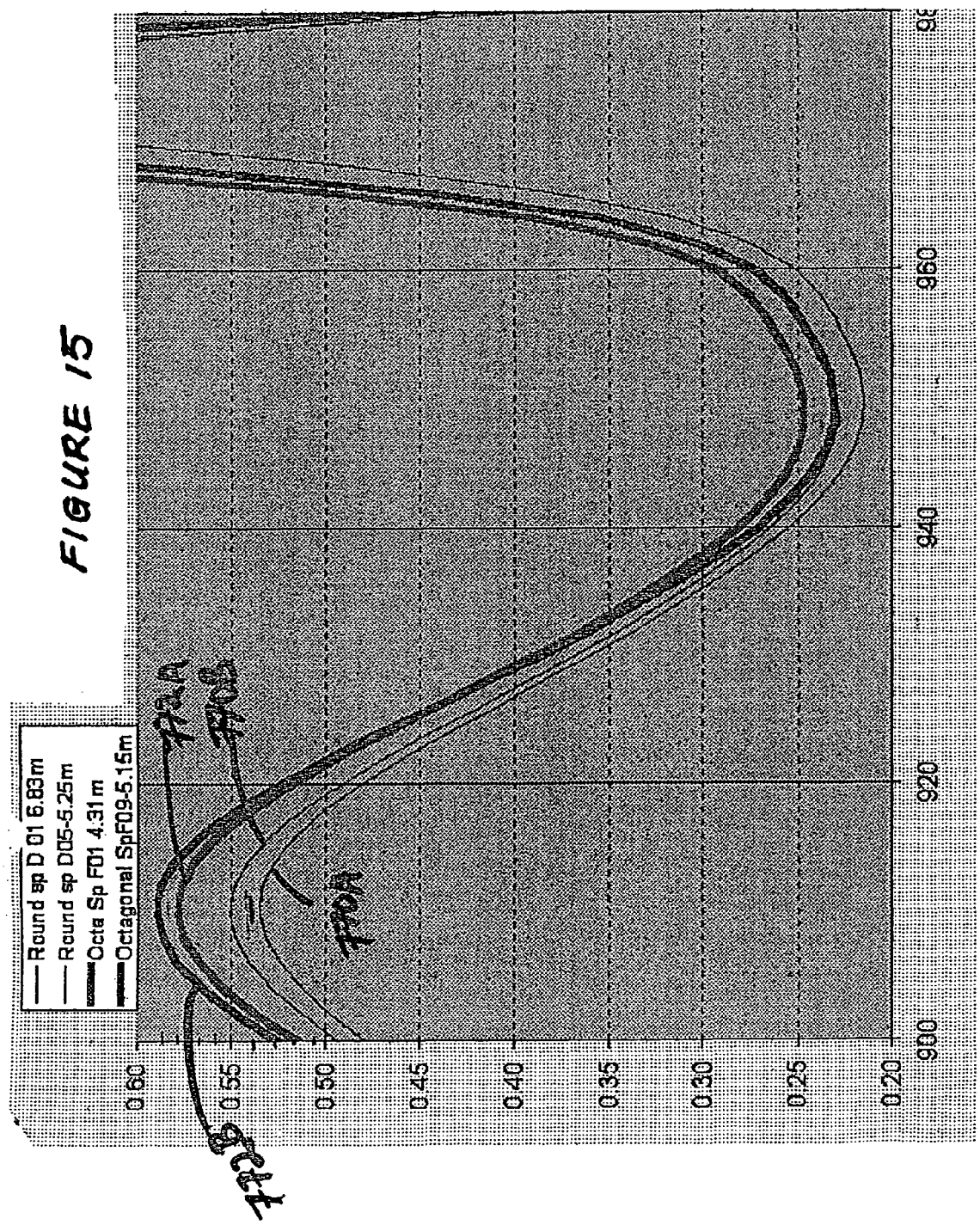
FIG. 15 is a plot of the absorption per unit length of two fibers of the type shown in FIG. 13 and two fibers of the type shown in FIG. 14, the fibers being identical except that the fibers of the type shown in FIG. 14 comprise an octagonal inner cladding and the fibers of the type shown in FIG. 13 comprise a round inner cladding.

With reference to FIG. 15, the curves 770A and 770B represent the performance of the inventive fibers and curves 772A and 772B represent the performance of the test fibers. Note that at the 915 nm absorption peak, the average absorption of the two test fibers is within about 0.05 dB of the average absorption of the two inventive fibers, and that the average absorption of the two test fibers is at most about 10% higher, in terms of dB, than the average absorption of the two inventive fibers. Given the experimental error in the measurements, the average absorption of the test fiber and the average absorption of the inventive fibers can be within 5% of each other.

Although the test and inventive fibers compared in FIG. 15 are single-mode and comprise a higher numerical aperture, the invention also embraces fibers having larger cores, lower numerical apertures or that are multimode.

Several embodiments of the invention have been described and illustrated herein. Those of ordinary skill in the art will readily envision a variety of other means and structures for performing the functions and/or for obtaining the results or advantages described herein and each of such variations or modifications is deemed to be within the scope of the present invention. For example, although disclosed herein is a specific embodiment of an optical fiber comprising a pair of stress inducing regions, one of ordinary skill, in light of the disclosure herein, readily appreciates that a fiber according to the invention can comprise any number of circular stress inducing regions, such as, for example, one, three or four circular stress inducing regions. As another example, although a fiber according to the invention can comprise a core having a step index of refraction profile relative to the cladding, wherein the index of refraction of the core is relatively constant across a diameter of the core, the index of refraction of the fiber need not be a step index. One type of fiber known in the art includes a graded index core that tends to bend light so as to keep the light in the core. If the core is multimode, the graded index core can equalize the path lengths traveled by the modes for reducing dispersion. Also, it is known in the art to confine a rare earth to certain regions of the core of the fiber, such as to the center of the core or to an annulus surrounding the center, so as to improve the performance of the optical fiber in certain respects. The foregoing variations are by way of example; many others are possible.

More generally, those skilled in the art would readily appreciate that all parameters, dimensions, materials and configurations described herein are meant to be exemplary and that actual parameters, dimensions, materials and configurations will depend on specific applications for which the teaching of the present invention are used. Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. For example, although the present invention is considered to be of particular use with certain types of fibers, such as conventional fibers, the invention can be practiced with other types of fibers, such as, for example, microstructured fibers. The present invention is directed to each individual feature, system, material and/or method described herein. In addition, any combination of two or more such features, systems, materials and/or methods, if such features, systems, materials and/or methods are not mutually inconsistent, is included within scope of the present invention.

It is therefore to be understood that the foregoing embodiments are presented by way of example only and that within the scope of the appended claims and equivalents thereto, the invention may be practiced otherwise than as specifically described. For example, as noted above silica is the preferable host glass of the fiber cladding and/or core, to which other materials are added, such as germanium in form of $GeO_2$ and fluorine. However, many other materials can be added to silica to affect the index of refraction or the photosensitivity of the fiber. Known dopant materials used with silica include, but are not limited to, aluminum, phosphorus, titanium, tantalum (known to be photosensitive), the rare earths (such as, for example, erbium, ytterbium and lanthanum) and transition metals, which can be used to provide selected attenuation. In addition, other types of glass, such as, for example, chalcogenide glass, ZBLAN glass, phosphate glass, fluoride glass, germanium based glass and the like, as well as any of the single crystal or polycrystalline materials such as thallium bromoiodide, germanium, zinc selenide, antimony silicate and the like, may be found suitable for the host glass of the core or cladding of a fiber according to the invention. More specifically, tin is known to be useful, at least as a co-dopant with germanium, to enhance photosensitivity. Photosensitive materials useful with at least silica, even in the absence of germanium, include cerium, europium, aluminum, phosphorus and tantalum. Fluorozirocnate fiber and silicon oxynitride fiber are also known to be photosensitive. By way of example, and not of limitation, an optical fiber according to the invention may comprise these or other materials, or variants thereof, singly or in combination in the core, cladding or other layers. Solution doping techniques noted above may be useful for incorporating photosensitive materials such as those described above into an optical fiber preform.

For example, MCVD can be used to deposit soot by reducing the temperature of the heating torch such that soot is deposited but not sintered on the inside of the substrate tube. The tube is then placed in a solution that includes fluid precursor materials, such as, for example, Sn, Ta or erbium chloride, that impregnates the porous soot.

It is therefore to be understood that the foregoing embodiments are presented by way of example only and that within the scope of the appended claims and equivalents thereto, the invention may be practiced otherwise than as specifically described. For example, as noted above silica is the preferable host glass of the fiber cladding and/or core, to which other materials are added, such as germanium in form of $GeO_2$ and boron in the form of $B_2O_3$.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 7th Edition, Revision 1.

We claim:

1. An optical fiber, comprising:
a photosensitive core comprising a concentration of a first material that increases the refractive index of the core and a concentration of a second material that is other than boron and that reduces the refractive index of the core;
a cladding disposed about the core for tending to confine light to the core;
at least one longitudinally extending region having a thermal coefficient of expansion (TCE) that is different from the TCE of the cladding whereby the optical fiber is photosensitive and birefringent, and
wherein the fiber has a polarization beat length of less than 25 mm at a wavelength of 1550 nm.

2. An optical fiber, comprising:
a photosensitive core comprising a concentration of a first material that increases the refractive index of the core and a concentration of a second material that is other than boron and that reduces the refractive index of the core;
a cladding disposed about the core for tending to confine light to the core;
at least one longitudinally extending region having a thermal coefficient of expansion (TCE) that is different from the TCE of the cladding whereby the optical fiber is photosensitive and birefringent; and
wherein the optical fiber has a second mode cutoff wavelength of less than 1800 nanometers.

3. An optical fiber, comprising:
a photosensitive core comprising a concentration of a first material that increases the refractive index of the core and a concentration of a second material that is other than boron and that reduces the refractive index of the core;
a cladding disposed about the core for tending to confine light to the core;
at least one longitudinally extending region having a thermal coefficient of expansion (TCE) that is different from the TCE of the cladding whereby the optical fiber is photosensitive and birefringent;
said cladding comprising an index of refraction, and wherein said fiber includes a second cladding disposed about said cladding, said second cladding comprising a second index of refraction that is less than said first index of refraction; and
wherein the core of the fiber is multimode and the fiber has a V number of at least 4 at a wavelength of 1550 nm.

4. An optical fiber, comprising:
a photosensitive core comprising a concentration of a first material that increases the refractive index of the core and a concentration of a second material that is other than boron and that reduces the refractive index of the core;
a cladding disposed about the core for tending to confine light to the core;
at least one longitudinally extending region having a thermal coefficient of expansion (TCE) that is different from the TCE of the cladding whereby the optical fiber is photosensitive and birefringent;
said cladding comprising an index of refraction, and wherein said fiber includes a second cladding disposed about said cladding, said second cladding comprising a second index of refraction that is less than said first index of refraction; and
wherein the core of the fiber is multimode and the fiber has a V number of at least 4 at a wavelength of 1550 nm and wherein the core comprises a numerical aperture of no greater than 0.09.

5. The optical fiber of claim 4 wherein the at least one longitudinally extending region comprises at least one pair of longitudinally extending regions spaced from the core, each of said pair having a generally circular outer perimeter.

6. An optical fiber, comprising:
a photosensitive core comprising a concentration of a first material that increases the refractive index of the core and a concentration of a second material that is other than boron and that reduces the refractive index of the core;
a cladding disposed about the core for tending to confine light to the core;
at least one longitudinally extending region having a thermal coefficient of expansion (TCE) that is different from the TCE of the cladding whereby the optical fiber is photosensitive and birefringent; and
wherein the core comprises a V number of at least 4 at a wavelength of 1550 nm.

7. A polarization-maintaining double-clad optical fiber, comprising:
an axially extending core comprising an active material and an index of refraction, said active material for, responsive to absorbing pump light, providing light having a wavelength that is different than the wavelength of the pump light;
a first cladding disposed about said core, said first cladding comprising a first index of refraction that is less than said index of refraction comprised by said core, said first cladding further comprising a thermal coefficient of expansion (TCE), said first cladding for receiving the pump light for absorption by said active material;
a second cladding disposed about said first cladding, said second cladding comprising a second index of refraction that is less than said first index of refraction comprised by said first cladding;
a pair of axially extending stress inducing regions for providing birefringence, each of said regions having a TCE that is different than said TCE of said first cladding, each of said regions being spaced from said core;
wherein said pair of stress inducing regions can cause sufficient scattering of pump light received by said first cladding such that the absorption of pump light per unit length of said fiber is within 15 percent of the absorption per unit length when said second cladding has an outer perimeter shaped as an octagon; and.
wherein said optical fiber has a polarization beat length of less than 25 mm measured at a wavelength of 1550 nm.

8. The optical fiber of claim 7 wherein each of said pair of axially extending stress inducing regions is circular.

9. A polarization-maintaining double-clad optical fiber, comprising:
an axially extending core comprising an active material and an index of refraction, said active material for, responsive to absorbing pump light, providing light having a wavelength that is different than the wavelength of the pump light;
a first cladding disposed about said core, said first cladding comprising a first index of refraction that is less than said index of refraction comprised by said core, said first cladding further comprising a thermal coefficient of expansion (TCE), said first cladding for receiving the pump light for absorption by said active material;

a second cladding disposed about said first cladding, said second cladding comprising a second index of refraction that is less than said first index of refraction comprised by said first cladding;

a pair of axially extending stress inducing regions for providing birefringence, each of said regions having a TCE that is different than said TCE of said first cladding, each of said regions being spaced from said core;

wherein said pair of stress inducing regions can cause sufficient scattering of pump light received by said first cladding such that the absorption of pump light per unit length of said fiber is within 15 percent of the absorption per unit length when said second cladding has an outer perimeter shaped as an octagon; and wherein said optical fiber has a polarization beat length of less than 10 mm measured at a wavelength of 1550 nm.

10. The optical fiber of claim 9 wherein each of said pair of axially extending stress inducing regions is circular.

11. A polarization-maintaining double-clad optical fiber, comprising:

an axially extending core comprising an active material and an index of refraction, said active material for, responsive to absorbing pump light, providing light having a wavelength that is different than the wavelength of the pump light;

a first cladding disposed about said core, said first cladding comprising a first index of refraction that is less than said index of refraction comprised by said core, said first cladding further comprising a thermal coefficient of expansion (TCE), said first cladding for receiving the pump light for absorption by said active material;

a second cladding disposed about said first cladding, said second cladding comprising a second index of refraction that is less than said first index of refraction comprised by said first cladding;

a pair of axially extending stress inducing regions for providing birefringence, each of said regions having a TCE that is different than said TCE of said first cladding, each of said regions being spaced from said core; and wherein said pair of stress inducing regions can cause sufficient scattering of pump light received by said first cladding such that the absorption of pump light per unit length of said fiber is within 15 percent of the absorption per unit length when said second cladding has an outer perimeter shaped as an octagon; and wherein said optical fiber has a second mode cutoff wavelength of less than 1800 nanometers.

12. The optical fiber of claim 11 wherein each of said pair of axially extending stress inducing regions is circular.

13. A polarization-maintaining double-clad optical fiber, comprising:

an axially extending core comprising an active material and an index of refraction, said active material for, responsive to absorbing pump light, providing light having a wavelength that is different than the wavelength of the pump light;

a first cladding disposed about said core, said first cladding comprising a first index of refraction that is less than said index of refraction comprised by said core, said first cladding further comprising a thermal coefficient of expansion (TCE), said first cladding for receiving the pump light for absorption by said active material;

a second cladding disposed about said first cladding, said second cladding comprising a second index of refraction that is less than said first index of refraction comprised by said first cladding;

a pair of axially extending stress inducing regions for providing birefringence, each of said regions having a TCE that is different than said TCE of said first cladding, each of said regions being spaced from said core;

wherein said pair of stress inducing regions can cause sufficient scattering of pump light received by said first cladding such that the absorption of pump light per unit length of said fiber is within 15 percent of the absorption per unit length when said second cladding has an outer perimeter shaped as an octagon; and wherein said optical fiber has a second mode cutoff wavelength of less than 1200 nanometers.

14. The optical fiber of claim 13 wherein each of said pair of axially extending stress inducing regions is circular.

15. A polarization-maintaining double-clad optical fiber, comprising:

an axially extending core comprising an active material and an index of refraction, said active material for, responsive to absorbing pump light, providing light having a wavelength that is different than the wavelength of the pump light;

a first cladding disposed about said core, said first cladding comprising a first index of refraction that is less than said index of refraction comprised by said core, said first cladding further comprising a thermal coefficient of expansion (TCE), said first cladding for receiving the pump light for absorption by said active material;

a second cladding disposed about said first cladding, said second cladding comprising a second index of refraction that is less than said first index of refraction comprised by said first cladding;

a pair of axially extending stress inducing regions for providing birefringence, each of said regions having a TCE that is different than said TCE of said first cladding, each of said regions being spaced from said core;

wherein said pair of stress inducing regions can cause sufficient scattering of pump light received by said first cladding such that the absorption of pump light per unit length of said fiber is within 15 percent of the absorption per unit length when said second cladding has an outer perimeter shaped as an octagon; and wherein said optical fiber comprises a wavelength of operation at which said active material can provide light responsive to being pumped by light having a different wavelength, and where said core comprises a V number of greater than 2.405 at said wavelength of operation.

16. The optical fiber of claim 15 wherein said core comprises a V number of greater than 4 at said wavelength of operation.

17. The optical fiber of claim 15 wherein each of said pair of axially extending stress inducing regions is circular.

18. The optical fiber of claim 16 wherein each of said pair of axially extending stress inducing regions is circular.

19. A polarization-maintaining double-clad optical fiber, comprising:

an axially extending core comprising an active material and an index of refraction, said active material for, responsive to absorbing pump light, providing light having a wavelength that is different than the wavelength of the pump light;

a first cladding disposed about said core, said first cladding comprising a first index of refraction that is less than said index of refraction comprised by said core, said first cladding further comprising a thermal coefficient of expansion (TCE), said first cladding for receiving the pump light for absorption by said active material;

a second cladding disposed about said first cladding, said second cladding comprising a second index of refraction that is less than said first index of refraction comprised by said first cladding;

a pair of axially extending stress inducing regions for providing birefringence, each of said regions having a TCE that is different than said TCE of said first cladding, each of said regions being spaced from said core;

wherein said pair of stress inducing regions can cause sufficient scattering of pump light received by said first cladding such that the absorption of pump light per unit length of said fiber is within 15 percent of the absorption per unit length when said second cladding has an outer perimeter shaped as an octagon;

wherein said outer perimeter of said second cladding is circular; and wherein said optical fiber has a polarization beat length of less than 25 mm measured at a wavelength of 1550 nm.

20. The optical fiber of claim 19 wherein each of said pair of axially extending stress inducing regions is circular.

21. A polarization-maintaining double-clad optical fiber, comprising:

an axially extending core comprising an active material and an index of refraction, said active material for, responsive to absorbing pump light, providing light having a wavelength that is different than the wavelength of the pump light;

a first cladding disposed about said core, said first cladding comprising a first index of refraction that is less than said index of refraction comprised by said core, said first cladding further comprising a thermal coefficient of expansion (TCE), said first cladding for receiving the pump light for absorption by said active material;

a second cladding disposed about said first cladding, said second cladding comprising a second index of refraction that is less than said first index of refraction comprised by said first cladding;

a pair of axially extending stress inducing regions for providing birefringence, each of said regions having a TCE that is different than said TCE of said first cladding, each of said regions being spaced from said core;

wherein said pair of stress inducing regions can cause sufficient scattering of pump light received by said first cladding such that the absorption of pump light per unit length of said fiber is within 15 percent of the absorption per unit length when said second cladding has an outer perimeter shaped as an octagon;

wherein said outer perimeter of said second cladding is circular; and wherein said optical fiber has a second mode cutoff wavelength of less than 1800 nanometers.

22. The optical fiber of claim 21 wherein each of said pair of axially extending stress inducing regions is circular.

23. A polarization-maintaining double-clad optical fiber, comprising:

an axially extending core comprising an active material and an index of refraction, said active material for, responsive to absorbing pump light, providing light having a wavelength that is different than the wavelength of the pump light;

a first cladding disposed about said core, said first cladding comprising a first index of refraction that is less than said index of refraction comprised by said core, said first cladding further comprising a thermal coefficient of expansion (TCE), said first cladding for receiving the pump light for absorption by said active material;

a second cladding disposed about said first cladding, said second cladding comprising a second index of refraction that is less than said first index of refraction comprised by said first cladding;

a pair of axially extending stress inducing regions for providing birefringence, each of said regions having a TCE that is different than said TCE of said first cladding, each of said regions being spaced from said core; and wherein said pair of stress inducing regions can cause sufficient scattering of pump light received by said first cladding such that the absorption of pump light per unit length of said fiber is within 15 percent of the absorption per unit length when said second cladding has an outer perimeter shaped as an octagon;

wherein said outer perimeter of said second cladding is circular; and wherein said optical fiber has a second mode cutoff wavelength of less than 1200 nanometers.

24. The optical fiber of claim 23 wherein each of said pair of axially extending stress inducing regions is circular.

25. A polarization-maintaining double-clad optical fiber, comprising:

an axially extending core comprising an active material and an index of refraction, said active material for, responsive to absorbing pump light, providing light having a wavelength that is different than the wavelength of the pump light;

a first cladding disposed about said core, said first cladding comprising a first index of refraction that is less than said index of refraction comprised by said core, said first cladding further comprising a thermal coefficient of expansion (TCE), said first cladding for receiving the pump light for absorption by said active material;

a second cladding disposed about said first cladding, said second cladding comprising a second index of refraction that is less than said first index of refraction comprised by said first cladding;

a pair of axially extending stress inducing regions for providing birefringence, each of said regions having a TCE that is different than said TCE of said first cladding, each of said regions being spaced from said core; and wherein said pair of stress inducing regions can cause sufficient scattering of pump light received by said first cladding such that the absorption of pump light per unit length of said fiber is within 15 percent of the absorption per unit length when said second cladding has an outer perimeter shaped as an octagon;

wherein said outer perimeter of said second cladding is circular; and wherein said optical fiber comprising comprises a wavelength of operation at which said active material can provide light responsive to being pumped by light having a different wavelength, and where said core comprises a V number of greater than 2.405 at said wavelength of operation.

26. The optical fiber of claim 25 wherein said core comprises a V number of greater than 4 at said wavelength of operation.

27. The optical fiber of claim 25 wherein each of said pair of axially extending stress inducing regions is circular.

28. The optical fiber of claim 26 wherein each of said pair of axially extending stress inducing regions is circular.

29. A polarization-maintaining, double-clad optical fiber, comprising:

an axially extending core comprising an active material and an index of refraction;

a first cladding disposed about said core, said first cladding comprising a first index of refraction that is less than said index of refraction comprised by said core, said first cladding further comprising a thermal coefficient of expansion (TCE) and a circular outer perimeter;

a second cladding disposed about said first cladding, said second cladding comprising a second index of refraction that is less than said first index of refraction comprised by said first cladding, said second cladding having a circular outer perimeter;

two and no more than two axially extending stress inducing regions for providing birefringence, each of said regions having a TCE that is different than said TCE of said first cladding, and each of said regions having a circular outer perimeter and being spaced from said core, and wherein said fiber has a beat length of less than 25 millimeters measured at a wavelength of 1550 nanometers and a second mode cutoff wavelength of less than 1800 nanometers.

30. The optical fiber of claim 29 wherein said fiber is constructed and arranged to provide an absorption per unit length that is within 15 percent of a test fiber that is identical to said fiber except that the outer perimeter of the first cladding of the test fiber is shaped as an octagon.

* * * * *

UNITED STATES PATENT AND TRADEMARK OFFICE
CERTIFICATE OF CORRECTION

PATENT NO. : 7,116,887 B2
APPLICATION NO. : 10/619376
DATED : October 3, 2006
INVENTOR(S) : Julia A. Farroni, Adrian Carter and Kanishka Tankala It is certified that error appears in the above-identified patent and that said Letters Patent is hereby corrected as shown below:

On the title page, item [63]
IN THE RELATED U.S. APPLICATION DATA:
Please replace the sentence "Continuation-in-part of application No. 10/392,243, filed on Mar. 19, 2003, now abandoned, which is a continuation-in-part of application No. 10/392,064, filed on Mar. 19, 2003, now abandoned." with --Continuation-in-part of application No. 10/392,064, filed on Mar. 19, 2003, now abandoned, and a continuation-in-part of application No. 10/392,243, filed on Mar. 19, 2003, now abandoned.--.

At column 4, line 67 please replace "can be greater the" with --can be greater than the--.
At column 6, line 48 please replace the word "comprising" with --comprise--.
At column 7, lines 39-40 please replace "is circular can be circular" with --can be circular--.

At column 14, line 39 please replace the word "perform" with --preform--.
At column 22, line 16 please replace "It also" with --It is also--.
At column 26, line 17 please delete the first "to".
At column 27, line 44 please replace "a octagon" with --an octagon--.
At column 31, line 22 please replace first "of" with --or--.
At column 32, line 63 please delete "at".

IN THE CLAIMS:
In Claim 25 at column 41, line 5 please delete "comprising".

Signed and Sealed this

Second Day of March, 2010

David J. Kappos
*Director of the United States Patent and Trademark Office*